US 9,571,249 B2

(12) United States Patent
Bhanage et al.

(10) Patent No.: US 9,571,249 B2
(45) Date of Patent: Feb. 14, 2017

(54) DYNAMIC CONTROL OF CHANNEL SOUNDING FOR TRANSMIT BEAMFORMING

(71) Applicant: Aruba Networks, Inc., Sunnyvale, CA (US)

(72) Inventors: Gautam Bhanage, Sunnyvale, CA (US); Manoj Gupta, Santa Clara, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 8 days.

(21) Appl. No.: 14/445,891

(22) Filed: Jul. 29, 2014

(65) Prior Publication Data

US 2016/0036572 A1 Feb. 4, 2016

(51) Int. Cl.
*H04W 4/00* (2009.01)
*H04L 5/00* (2006.01)
*H04W 16/28* (2009.01)
*H04B 7/06* (2006.01)

(52) U.S. Cl.
CPC .......... *H04L 5/0048* (2013.01); *H04B 7/0617* (2013.01); *H04B 7/0619* (2013.01); *H04B 7/0626* (2013.01); *H04W 16/28* (2013.01)

(58) Field of Classification Search
CPC .............................. H04L 5/0048; H04W 16/28
See application file for complete search history.

(56) References Cited

U.S. PATENT DOCUMENTS

| | | | | |
|---|---|---|---|---|
| 2006/0165008 A1* | 7/2006 | Li | ............ | H04L 1/0019 370/252 |
| 2007/0230373 A1* | 10/2007 | Li | ............ | H04B 7/0447 370/267 |
| 2009/0274226 A1* | 11/2009 | Mondal | ............ | H04L 5/0023 375/260 |
| 2010/0029320 A1* | 2/2010 | Malladi | ............ | H04L 27/2614 455/522 |
| 2010/0041410 A1* | 2/2010 | Englund | ............ | H04W 72/1268 455/450 |
| 2010/0112952 A1* | 5/2010 | Molnar | ............ | H01Q 1/246 455/63.1 |
| 2010/0202372 A1* | 8/2010 | Chun | ............ | H04L 5/0057 370/329 |

(Continued)

*Primary Examiner* — Gregory Sefcheck
*Assistant Examiner* — Jael Ulysse
(74) *Attorney, Agent, or Firm* — Brooks, Cameron & Huebsch, PLLC

(57) ABSTRACT

The present disclosure discloses a system and method for dynamic control of channel sounding for transmit beamforming. Generally, sounding frames are periodically transmitted by a network device to a particular device at a first sounding interval. First feedback information is received from the particular device. The first feedback information corresponds to the sounding frames transmitted at the first sounding interval. Based on one or more current conditions included in the feedback information, a second sounding interval is selected to transmit the sounding frames to the particular device. The sounding frames are periodically transmitted to the particular device at the second sounding interval. Second feedback information is received from the particular device. The second feedback information corresponds to the sounding frames transmitted at the second sounding interval.

19 Claims, 18 Drawing Sheets

(56) References Cited

U.S. PATENT DOCUMENTS

| | | | |
|---|---|---|---|
| 2010/0208781 A1* | 8/2010 | Wentink | H04B 7/0697 375/219 |
| 2010/0220614 A1* | 9/2010 | Seong | H04W 72/085 370/252 |
| 2011/0128947 A1* | 6/2011 | Liu | H04L 25/03343 370/338 |
| 2011/0199946 A1* | 8/2011 | Breit | H04B 7/0626 370/310 |
| 2012/0026909 A1* | 2/2012 | Seok | H04B 7/0417 370/252 |
| 2013/0094488 A1* | 4/2013 | Choi | H04W 16/28 370/338 |
| 2013/0230079 A1* | 9/2013 | Solomon | H04B 7/0413 375/219 |
| 2013/0272263 A1* | 10/2013 | Pi | H04W 72/042 370/330 |
| 2014/0105200 A1* | 4/2014 | Seok | H04W 72/0406 370/338 |
| 2014/0148155 A1* | 5/2014 | Batta | H04W 36/0083 455/432.1 |
| 2014/0154992 A1* | 6/2014 | Silverman | H04W 16/28 455/63.4 |
| 2014/0269961 A1* | 9/2014 | Gao | H04L 1/0027 375/267 |
| 2014/0328247 A1* | 11/2014 | Silverman | H04L 25/0228 370/328 |
| 2015/0237513 A1* | 8/2015 | Garrett | H04L 25/0224 370/252 |

\* cited by examiner

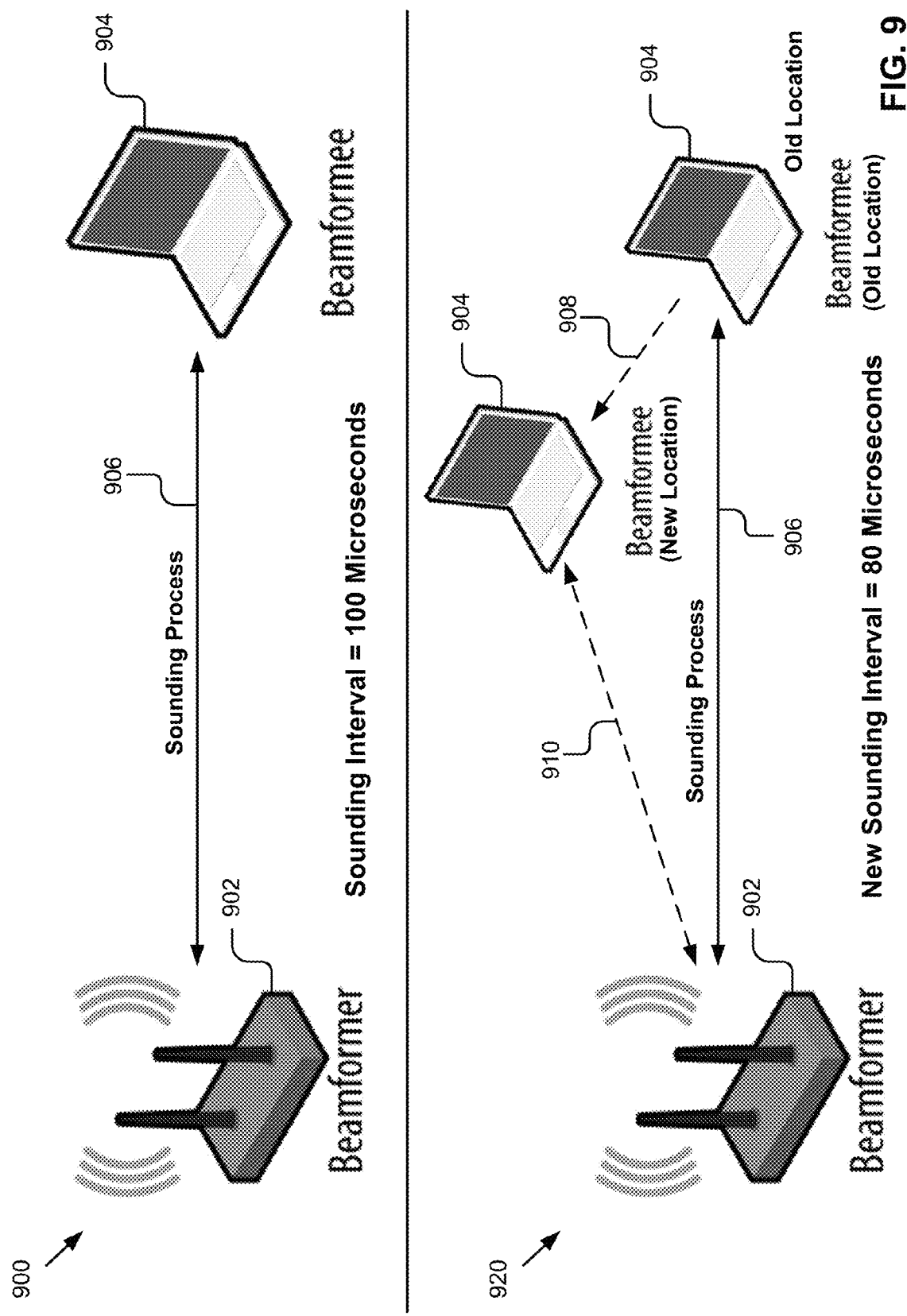

DYNAMIC CONTROL OF CHANNEL SOUNDING FOR TRANSMIT BEAMFORMING

FIELD

The present disclosure relates to dynamic control of channel sounding for transmit beamforming. In particular, the present disclosure relates to dynamically controlling channel sounding intervals based on client device mobility, airtime used by the client device during a sounding process, a combination of the two, and/or one or more other criteria for transmitting beamformed network signals to the client device.

BACKGROUND

Depending on a channel bandwidth (number of subcarriers) and antenna transmitting and receiving configurations, the size of a beamforming report that is used to calculate a steering matrix at an access point can vary significantly. Typically, an average time of a sounding process using a standard based approach takes around 500 microseconds. This sounding can be done either on a per packet basis or at a coarser granularity based on configuration. If this sounding is done at very frequent sounding intervals, one can achieve superior beamforming gains. However, these increased beamforming gains would come at a cost of increased airtime required for the sounding. On the other hand, if this sounding is done infrequently and the location of a client device to which to transmit beamforming changes or if the multipath to the client device changes significantly, then the expected beamforming gains that one would expect may be reduced and further may result in lower rates and higher airtime consumption for the data transmission.

BRIEF DESCRIPTION OF THE DRAWINGS

The present disclosure may be best understood by referring to the following description and accompanying drawings that are used to illustrate embodiments of the present disclosure.

FIG. 9 is an example graphical representation illustrating dynamic adjustment of sounding interval based on movement of an example beamformee from one location to another.

DETAILED DESCRIPTION

Figure 1:
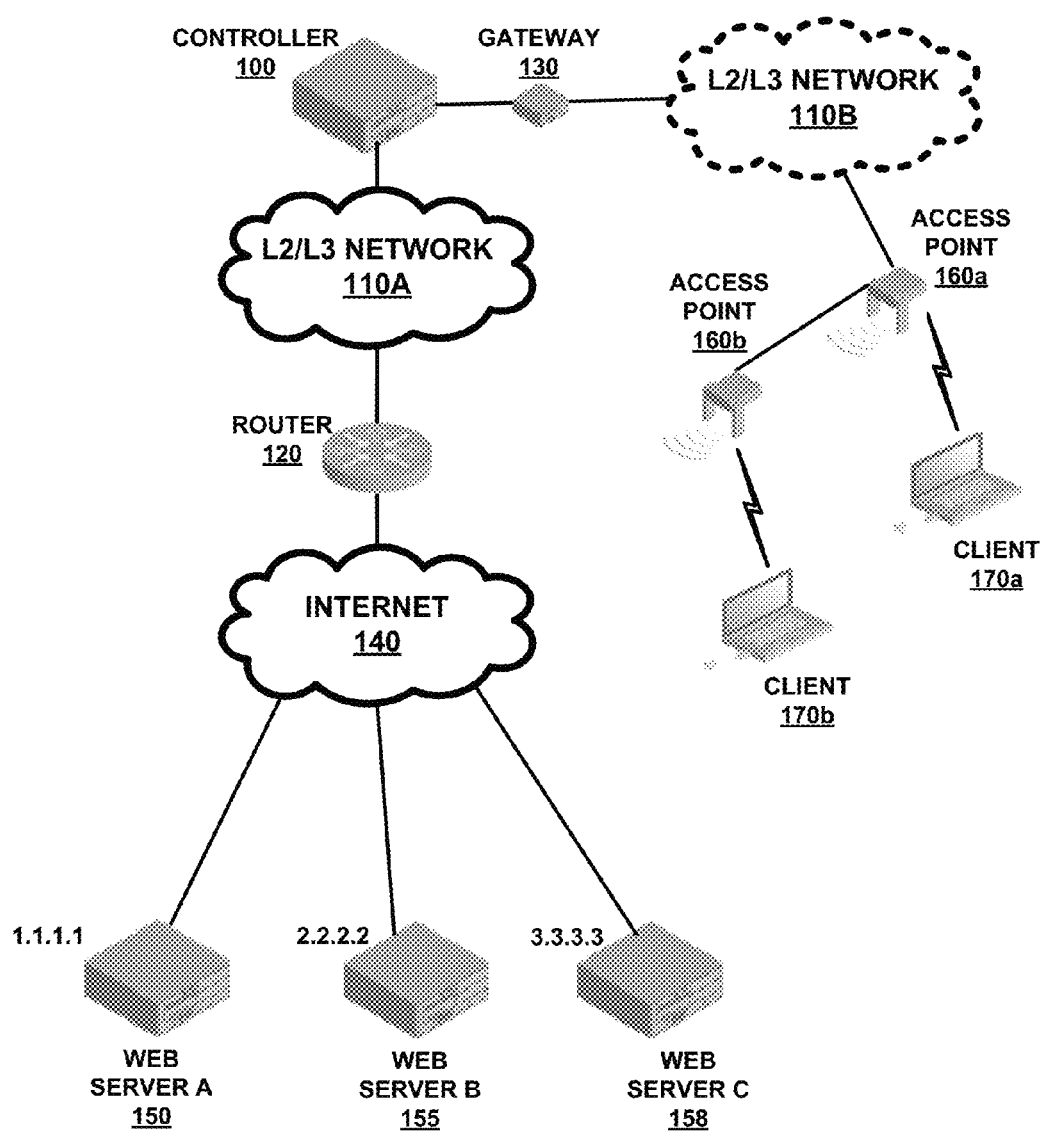
FIG. 1 is a block diagram illustrating an example network environment according to embodiments of the present disclosure.

In the following description, several specific details are presented to provide a thorough understanding. While the context of the disclosure is directed to dynamic control of channel sounding for transmit beamforming, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

Overview

Embodiments of the present disclosure relates to dynamic control of channel sounding for transmit beamforming. In particular, the present disclosure relates to dynamically controlling a channel sounding interval based on feedback information from a client device (also referred to herein as a beamformee). The sounding interval refers to how frequently a sounding process is performed. For example, if the sounding interval is scaled down, the frequency of performing the sounding process increases. In some embodiments, the feedback information may be computed based on sounding frames sent by a network device (also referred to herein as a beamformer). Using the feedback information, the beamformer can adjust the sounding interval for initiating a sounding process with the beamformee at that interval and also can compute a steering matrix to steer transmissions (e.g., data packets/frames, network signals, etc.) towards the beamformee in a particular direction. In some embodiments, the process of transmission of data packets, sounding frames, and/or network signals towards the beamformee in the particular direction is generally known as beamforming.

In some embodiments, the dynamic channel sounding mechanism may be enabled or disabled through explicit control of an administrator. Also, in some embodiments, the administrator can set a default value for the sounding interval. In other embodiment, the administrator can set a default value for the highest value of the sounding interval.

In other embodiments, the administrator can also set a default value for the least value for the sounding interval.

In some embodiments, a beamformer can adjust the sounding interval based on a change in location of a beamformee in a sounding environment or based on a change in multipath to the beamformee. In some embodiments, the change in location information for the beamformee may be included in the feedback information and the beamformer may analyze the feedback information to determine whether the beamformee location has been changed. In some embodiments, the location information of the beamformee is obtained from other services of this system 200. Responsive to determining the beamformee's change in location, the beamformer can adjust the sounding interval to initiate a sounding process with the beamformee more frequently. For example, the beamformer can decrease a sounding interval from 100 microseconds to 80 microseconds to perform the sounding process more frequently. Adjusting the sounding interval based on beamformee's mobility in the sounding environment is advantageous as it enables the beamformer to be frequently updated of the beamformee's current location and transmit beamforming in the right direction of the beamformer to achieve maximum beamforming gains. Similarly, responsive to determining that multipath to the beamformee has changed, the beamformer can adjust the sounding interval to initiate a sounding process with the beamformee more frequently.

In some embodiments, a beamformer can adjust the sounding interval based on determining a change in airtime consumption by a beamformee during a sounding process. The change in airtime per bit used by the beamformee may be an indirect indication of the link quality. For example, if a beamformee location changes, the previous sounding information becomes stale. If now a lesser received signal strength indicator at the beamformee is received, the rate control switches to a lower rate and therefore a higher airtime for sending the same bit of information is needed. In this example, the sounding interval would be scaled down and the sounding process may be performed more frequently. This scaling up or down of the sounding interval based on the airtime consumption is advantageous as it enables the beamformer to initiate a subsequent sounding process with the beamformee at correct or more optimal sounding interval considering the increase or decrease in airtime took by the beamformee during the prior sounding process.

In some embodiments, a beamformer can adjust a sounding interval based on a combination of beamformee's location information (or based on a change in multipath to the beamformee) and the beamformee's airtime consumption information. The beamformee's location information and the airtime consumption information may be included in the feedback information as discussed elsewhere herein. In some embodiments, the beamformer may increase the sounding interval upon determining the beamformee's location and the airtime consumption to be static/unchanged. This is advantageous as frequent or unnecessary sounding with the beamformee may be avoided if the beamformee found to be constant during two or more sounding processes in the sounding environment. In some embodiments, the beamformer may decrease the sounding interval upon finding either of the beamformee's location (or change in multipath to the beamformee) and/or airtime consumption to be changed as discussed elsewhere herein.

In some embodiments, a beamformer can adjust a sounding interval based on one or more other criteria. The one or more other criteria may include, for example and without limitation, current transmission rate being used for transmissions to a beamformee; current distance of the beamformee from the beamformer; packet error rate for packets exchanged between the beamformee and the beamformer; channels state information describing current state of the channel (i.e., whether the channels is strong/weak, current load of the channel, etc.); amount of traffic (i.e., frames/data packets) exchanged between the beamformee and the beamformer; virtual access point (VAP) associated with the beamformee; type of user associated with the beamformee, type of beamformee (i.e., whether the beamformee/client device is a tablet, smartphone, desktop, laptop, etc.); characteristics of data transmitted by the beamformee (i.e., whether the data transmitted by the beamformee is a high priority data or low priority data); movement of other beamformee's in the sounding environment relative to the beamformee current location; multipath to the beamformee; characteristics associated with the one or more beamformee's; number of beamformee's associated with the beamformer for transmission; etc.

Computing Environment

FIG. 1 shows an example digital network environment 199 according to embodiments of the present disclosure. FIG. 1 includes at least one or more network controller (such as controller 100), one or more access points (such as access point 160a, 160b), one or more client devices (such as client point 170a, 170b), a layer 2 or layer 3 network (such as L2/L3 network 110a, 110b), a routing device (such as router 120), a gateway 130, Internet 140, and one or more web servers (such as web server A 150, web server B 155, and web server C 158), etc. The components of the digital network environment 199 are communicatively coupled to each other. In some embodiments, the digital network environment 199 may include other components not shown in FIG. 1 such as an email server, a cloud-based storage device, etc. It is intended that any of the servers shown may represent an email server instead as illustrated with email functionalities and any of the network devices may serve as a cloud-based storage device. The network 140 may be implemented within a cloud environment. In FIG. 1 and the remaining figures, a letter after a reference number, e.g., "160a," represents a reference to the element having that particular reference number. A reference number in the text without a following letter, e.g., "160," represents a general reference to implementations of the element bearing that reference number.

The controller 100 is a hardware device and/or software module that provide network managements, which include but are not limited to, controlling, planning, allocating, deploying, coordinating, and monitoring the resources of a network, network planning, frequency allocation, predetermined traffic routing to support load balancing, cryptographic key distribution authorization, configuration management, fault management, security management, performance management, bandwidth management, route analytics and accounting management, etc. In some embodiments, the controller 100 is an optional component in the digital network environment 199.

Moreover, assuming that a number of access points, such as access point 160, are interconnected with the network controller 100. Each access point 160 may be interconnected with zero or more client devices via either a wired interface or a wireless interface. In this example, for illustration purposes only, assuming that the client 170a is associated with the access point 160a via a wireless link. An access point 160 generally refers to a network device that allows wireless clients to connect to a wired network. Access points 160 usually connect to a controller 100 via a wired network or can be a part of a controller 100 in itself. For example, the access point 160a is connected to the controller 100 via an optional L2/L3 network 110B. In some embodiments, an access point 160 can be connected to another access point 160. For example, the access point 160a is connected to the access point 160b.

Wired interfaces typically include IEEE 802.3 Ethernet interfaces, used for wired connections to other network devices such as switches, or to a controller. Wireless interfaces may be WiMAX, 3G, 4G, and/or IEEE 802.11 wireless interfaces. In some embodiments, controllers and APs may operate under control of operating systems, with purpose-built programs providing host controller and access point functionality.

Furthermore, the controller 100 can be connected to the router 120 through zero or more hops in a layer 3 or layer 2 network (such as L2/L3 Network 110A). The router 120 can forward traffic to and receive traffic from the Internet 140. The router 120 generally is a network device that forwards data packets between different networks, and thus creating an overlay internetwork. A router 120 is typically connected to two or more data lines from different networks. When a data packet comes in one of the data lines, the router 120 reads the address information in the packet to determine its destination. Then, using information in its routing table or routing policy, the router 120 directs the packet to the next/different network. A data packet is typically forwarded from one router 120 to another router 120 through the Internet 140 until the packet gets to its destination.

The gateway 130 is a network device that passes network traffic from local subnet to devices on other subnets. In some embodiments, the gateway 130 may be connected to a controller 100 or be a part of the controller 100 depending on the configuration of the controller 100. In some embodiments, the gateway 130 is an optional component in the digital network environment 199.

Web servers 150, 155, and 158 are hardware devices and/or software modules that facilitate delivery of web content that can be accessed through the Internet 140. For example, the web server A 150 may be assigned an IP address of 1.1.1.1 and used to host a first Internet website (e.g., www.yahoo.com); the web server B 155 may be assigned an IP address of 2.2.2.2 and used to host a second Internet website (e.g., www.google.com); and, the web server C 158 may be assigned an IP address of 3.3.3.3 and used to host a third Internet website (e.g., www.facebook.com).

The clients 170a and 170b (also individually and collectively referred to as 170) are computing devices that includes a memory and a processor, for example a laptop computer, a desktop computer, a tablet computer, a mobile telephone, a personal digital assistant (PDA), a mobile email device, a portable game player, a portable music player, a reader device, a television with one or more processors embedded therein or coupled thereto or other electronic device capable of accessing a network. Although only two clients 170 are illustrated in FIG. 1, a plurality of clients 170 can be included in FIG. 1. As illustrated, the clients 170 may receive network signals (e.g., WI-FI signals) to connect to a network (e.g., internet) from the access points 160. It should be understood that these access points 160 providing the clients 170 with the network signals may be sometimes interchangeably referred to as beamformers and the clients 170 receiving the network signals from the access points 160 may be interchangeably referred to as beamformees throughout this disclosure.

Network Device for Channel Sounding Application

Figure 2:
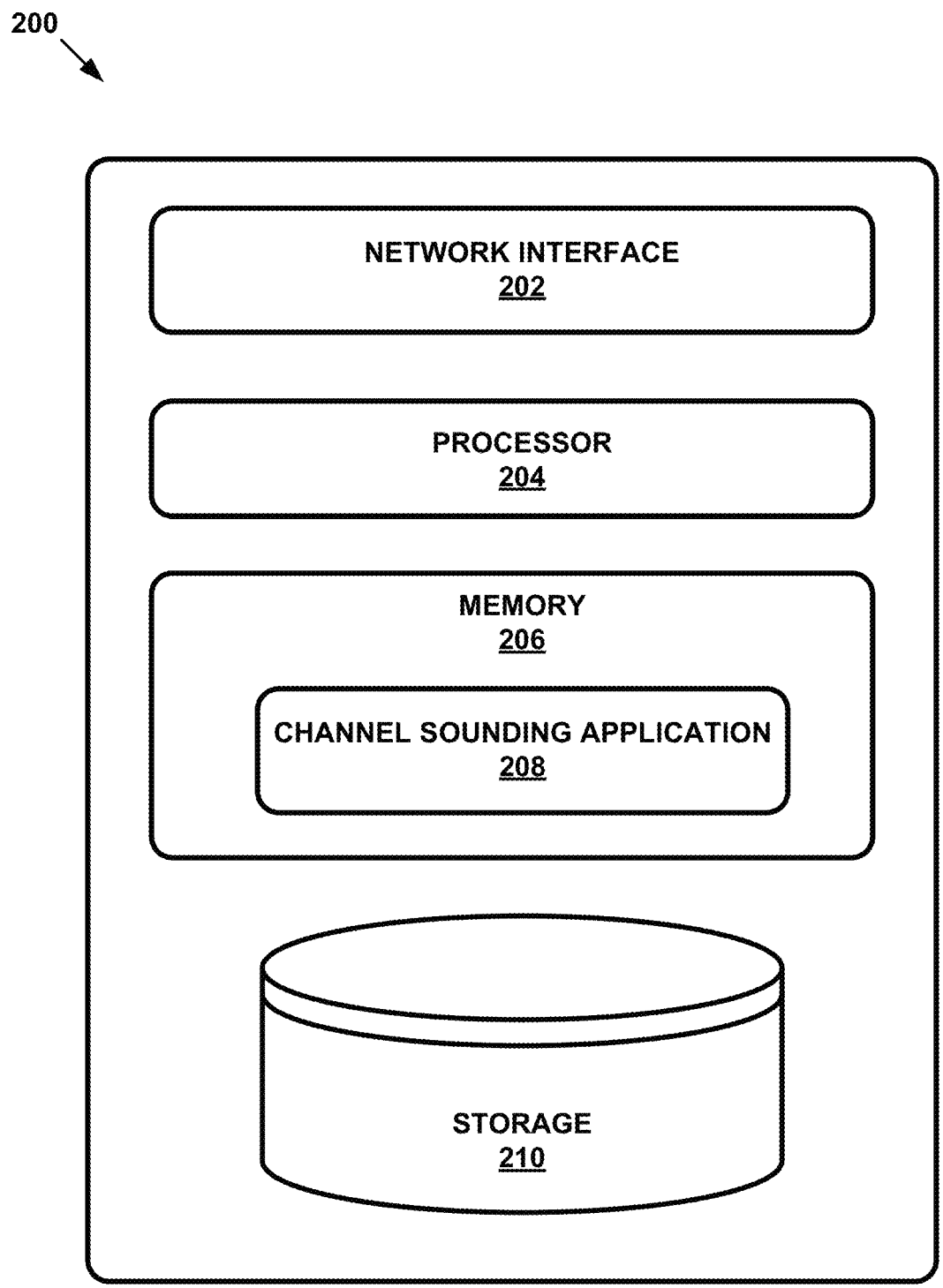
FIG. 2 is a block diagram illustrating an example network device according to embodiments of the present disclosure.

FIG. 2 is a block diagram illustrating an example network device system 200 for dynamically controlling sounding intervals for initiating a sounding process with a client 170 and transmitting beamformed network signals to the client 170 according to embodiments of the present disclosure. The network device 200 may be used as a network switch, a network router, a network controller, a network server, an access point, etc. Further, the network device 200 may serve as a node in a distributed or a cloud computing environment.

According to embodiments of the present disclosure, network services provided by the network device 200, solely or in combination with other wireless network devices, include, but are not limited to, an Institute of Electrical and Electronics Engineers (IEEE) 802.1x authentication to an internal and/or external Remote Authentication Dial-In User Service (RADIUS) server; an MAC authentication to an internal and/or external RADIUS server; a built-in Dynamic Host Configuration Protocol (DHCP) service to assign wireless client devices IP addresses; an internal secured management interface; Layer-3 forwarding; Network Address Translation (NAT) service between the wireless network and a wired network coupled to the network device; an internal and/or external captive portal; an external management system for managing the network devices in the wireless network; etc. In some embodiments, the network device or system 200 may serve as a node in a distributed or a cloud computing environment.

In some embodiments, the network device 200 includes a network interface 202 capable of communicating to a wired network, a processor 204, a memory 206 and a storage device 210. The components of the network device 200 are communicatively coupled to each other.

The network interface 202 can be any communication interface, which includes but is not limited to, a modem, token ring interface, Ethernet interface, wireless IEEE 802.11 interface (e.g., IEEE 802.11n, IEEE 802.11ac, etc.), cellular wireless interface, satellite transmission interface, or any other interface for coupling network devices. In some embodiments, the network interface 202 may be software-defined and programmable, for example, via an Application Programming Interface (API), and thus allowing for remote control of the network device 200.

The processor 204 includes an arithmetic logic unit, a microprocessor, a general purpose controller or some other processor array to perform computations and provide electronic display signals to a display device. Processor 204 processes data signals and may include various computing architectures including a complex instruction set computer (CISC) architecture, a reduced instruction set computer (RISC) architecture, or an architecture implementing a combination of instruction sets. Although FIG. 2 includes a single processor 204, multiple processors 204 may be included. Other processors, operating systems, sensors, displays and physical configurations are possible. In some embodiments, the processor 204 includes a networking processor core that is capable of processing network data traffic.

The memory 206 stores instructions and/or data that may be executed by the processor 204. The instructions and/or data may include code for performing the techniques described herein. The memory 206 may be a dynamic random access memory (DRAM) device, a static random access memory (SRAM) device, flash memory or some other memory device. In some embodiments, the memory 206 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the memory 206 stores a channel sounding application 208. The channel sounding application 208 can be the code and routines that, when executed by processor 204, cause the network device 200 to initiate a sounding process between an access point 160 and a client 170, transmit beamformed signals to the client 170 based on the sounding process, and dynamically adjust a sounding interval for initiating subsequent sounding processes between the access point 160 and the client 170. In some embodiments, the channel sounding application 208 can be implemented using hardware including a Field-Programmable Gate Array (FPGA) or an Application-Specific Integrated Circuit (ASIC). In some other embodiments, the channel sounding application 208 can be implemented using a combination of hardware and software. In some embodiments, the channel sounding application 208 may be stored in a combination of the network devices, or in one of the network devices. The channel sounding application 208 is described below in more detail with reference to FIG. 3.

The storage device 210 can be a non-transitory memory that stores data for providing the functionality described herein. The storage device 210 may be a dynamic random access memory (DRAM) device, a static random access memory (SRAM) device, flash memory or some other memory devices. In some embodiments, the storage device 210 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

Channel Sounding Application

Figure 3:
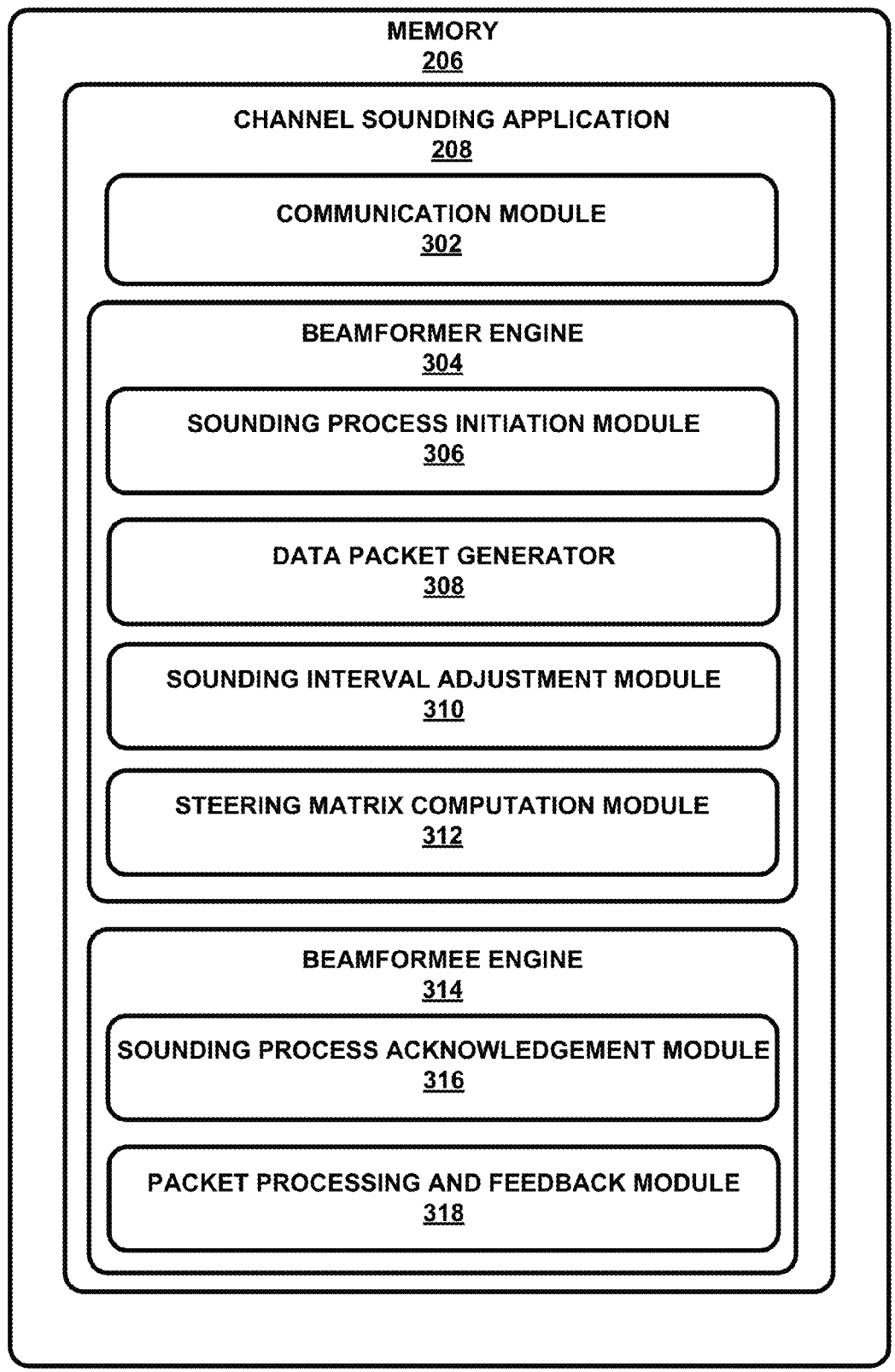
FIG. 3 is a block diagram illustrating an example channel sounding application according to some embodiments of the present disclosure. The channel sounding application is stored on a memory of the example network device or system.

FIG. 3 illustrates an example channel sounding application 208 stored on a memory 206 according to embodiments of the present disclosure. In some embodiments, the channel sounding application 208, as depicted, includes a communication module 302, a beamformer engine 304, and a beamformee engine 314. The beamformer engine 304 may include a sounding process initiation module 306, a data packet generator 308, a sounding interval adjustment module 310, and a steering matrix computation module 312. The beamformee engine 314 may include a sounding process acknowledgement module 316 and a packet processing and feedback module 318.

The channel sounding application 208 can be software including routines for initiating a sounding process between a network device (also known as beamformer) and a client device (also known as beamformee) and dynamically adjusting sounding interval for initiating subsequent sounding processes based on feedback information from the beamformee. In some embodiments, the channel sounding application 208 can be a set of instructions executable by the processor 204 to provide the functionality described herein. In some other embodiments, the channel sounding application 208 can be stored in the memory 206 and can be accessible and executable by the processor 204.

The communication module 302 can be software including routines for handling communications between one or more components of the beamformer engine 304 and the beamformee engine 314. For instance, the one or more components of the beamformer engine 304 and the beamformee engine 314 may interact with one another via the communication module 302 to perform a sounding process.

By way of example, the sounding process initiation module 306 of the beamformer engine 304 and the sounding process acknowledgement module 316 of the beamformee engine may interact with one another via the communication module 302 to initiate a sounding process between a beamformer and a beamformee. In some embodiments, the communication module 302 may be further capable of handling communications between the channel sounding application 208 including its one or more components and other components in the digital network environment 199 as depicted in FIG. 1.

In some embodiments, the communication module 302 can be a set of instructions executable by the processor 204 to provide the functionality described herein. In some other embodiments, the communication module 302 can be stored in the memory 206 of the network device 200 and can be accessible and executable by the processor 204. The communication module 302 may be adapted for cooperation and communication with the processor 204 and other components of the network device 200 such as the network interface 202, the storage 210, etc. In some embodiments, the communication module 302 sends and receives data to and from one or more of a client 170 (FIG. 1), an access point 160 (FIG. 1) and other network devices via the network interface 202 (FIG. 2), in the event of distributed functionalities. In some embodiments, the communication module 302 receives data from other components of the access control application 208 and stores the data in the storage device 210.

The beamformer engine 304 can be software including routines for initiating a sounding process with a beamformee at a particular sounding interval, transmit a beamforming to the beamformee based on feedback information from the beamformee, and dynamically adjust the sounding interval based on the feedback information. In some embodiments, the beamformer engine 304 can be a set of instructions executable by the processor 204 to provide the functionality described herein. In some other embodiments, the beamformer engine 304 can be stored in the memory 206 and can be accessible and executable by the processor 204. As depicted, the beamformer engine 304 may include the sounding process initiation module 306, the data packet generator 308, the sounding interval adjustment module 310, and the steering matrix computation module 312.

The sounding process initiation module 306 can be software including routines for initiating a sounding process between a beamformer and a beamformee. In some embodiments, the beamformer may be a network device capable of transmitting network signals to a receiver device such as a client device. For example, the beamformer may be an access point 160. In some embodiments, the beamformee may be a receiver device capable of receiving the network signals from the beamformer. For example, the beamformee may be a client 170. In some embodiments, the sounding process initiation module 306 can be a set of instructions executable by the processor 204 to provide the functionality described herein. In some other embodiments, the sounding process initiation module 306 can be stored in the memory 206 of the network device 200 and can be accessible and executable by the processor 204. The sounding process initiation module 306 may be adapted for cooperation and communication with the processor 204 and other components of the network device 200 such as the network interface 202, the storage 210, etc.

In some embodiments, the sounding process may be initiated by the sounding process initiation module 306 to determine how to radiate energy or network signals towards the beamformee in a preferred direction. In some embodiments, the sounding process may enable a beamformer to identify a sounding channel on which to radiate the energy or the network signals towards the beamformee. Radiating the network signals on this sounding channel is advantageous as it enables the beamformer and the beamformee to get maximum performance and best data transmission rates during communication while avoiding other paths, carriers, and/or sounding channels with weak performance and poor transmission rates.

Figure 8A:
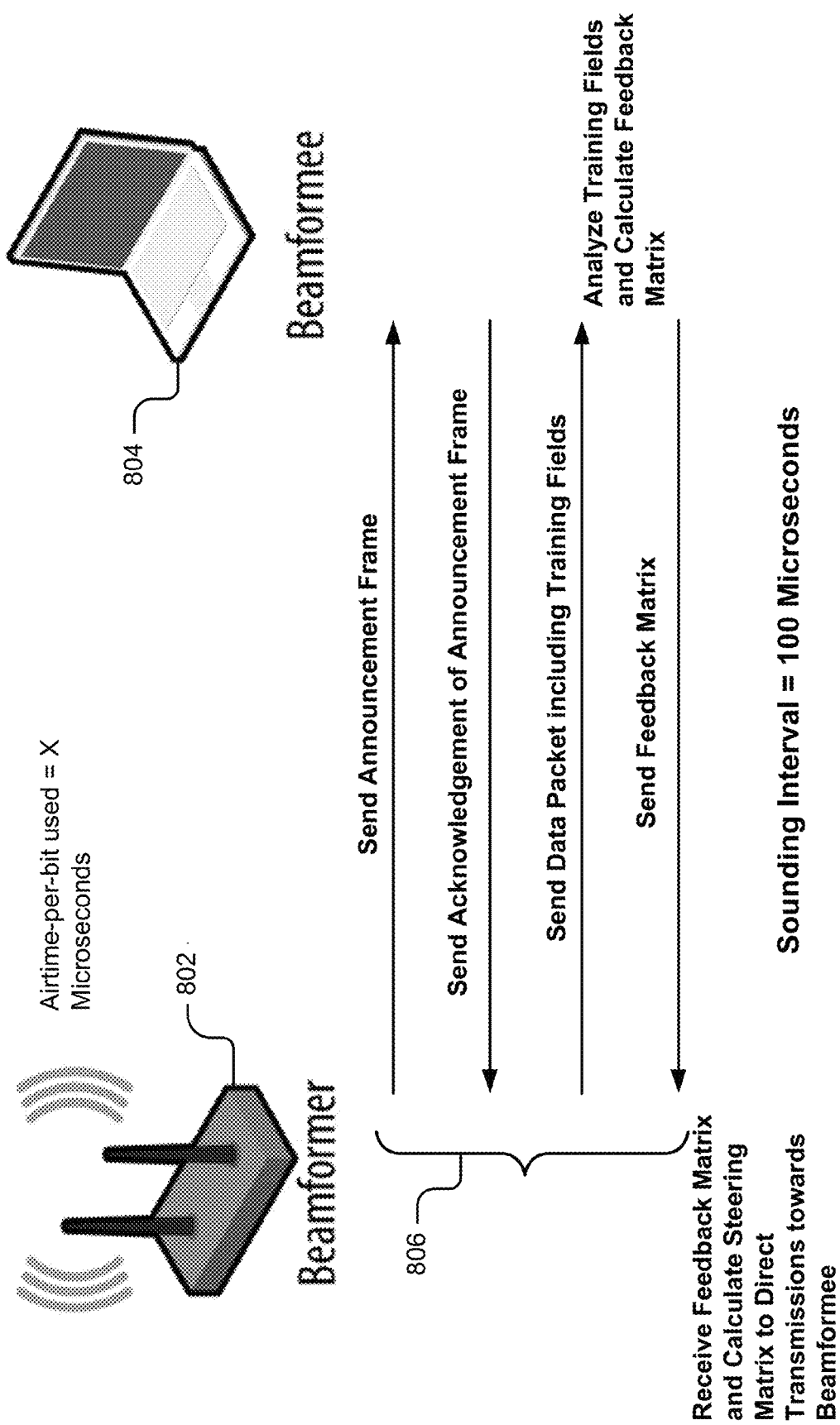
FIGS. 8A and 8B are example graphical representations illustrating an example sounding process and a process for dynamically adjusting sounding interval based on an increase in airtime used by an example beamformee during the sounding process according to embodiments of the present disclosure.

In some embodiments, the sounding process initiation module 306 may initiate the sounding process at a particular sounding interval. The sounding interval may be a pre-determined sounding interval or may be dynamically adjusted based on feedback information from the beamformee as discussed below in detail with respect to the sounding interval adjustment module 310. Initiating the sounding interval at the particular sounding interval means that the sounding process initiation module 306 may initiate a sounding process between a beamformer and a beamformee at the time interval pre-set or dynamically set by the sounding interval adjustment module 310. For example, the sounding process initiation module 306 may initiate the sounding process at 100 microseconds as depicted in FIG. 8A.

In some embodiments, the sounding process initiation module 306 may initiate the sounding process with a beamformee by sending an announcement frame in a sounding environment. For instance, the sounding process initiation module 306 may cooperate with the communication module 302 to send the announcement frame as depicted for example in FIGS. 8A and 8B. In some embodiments, the announcement frame may be a null data packet (NDP) announcement frame and may be used to gain control of a sounding channel for data transmission and to identify one or more beamformees present in the sounding environment. The one or more beamformees may then respond to the NDP announcement frame to initiate the sounding process with a beamformer from which the announcement frame was received as further discussed below with respect to the sounding process acknowledgement module 316.

Figure 10:
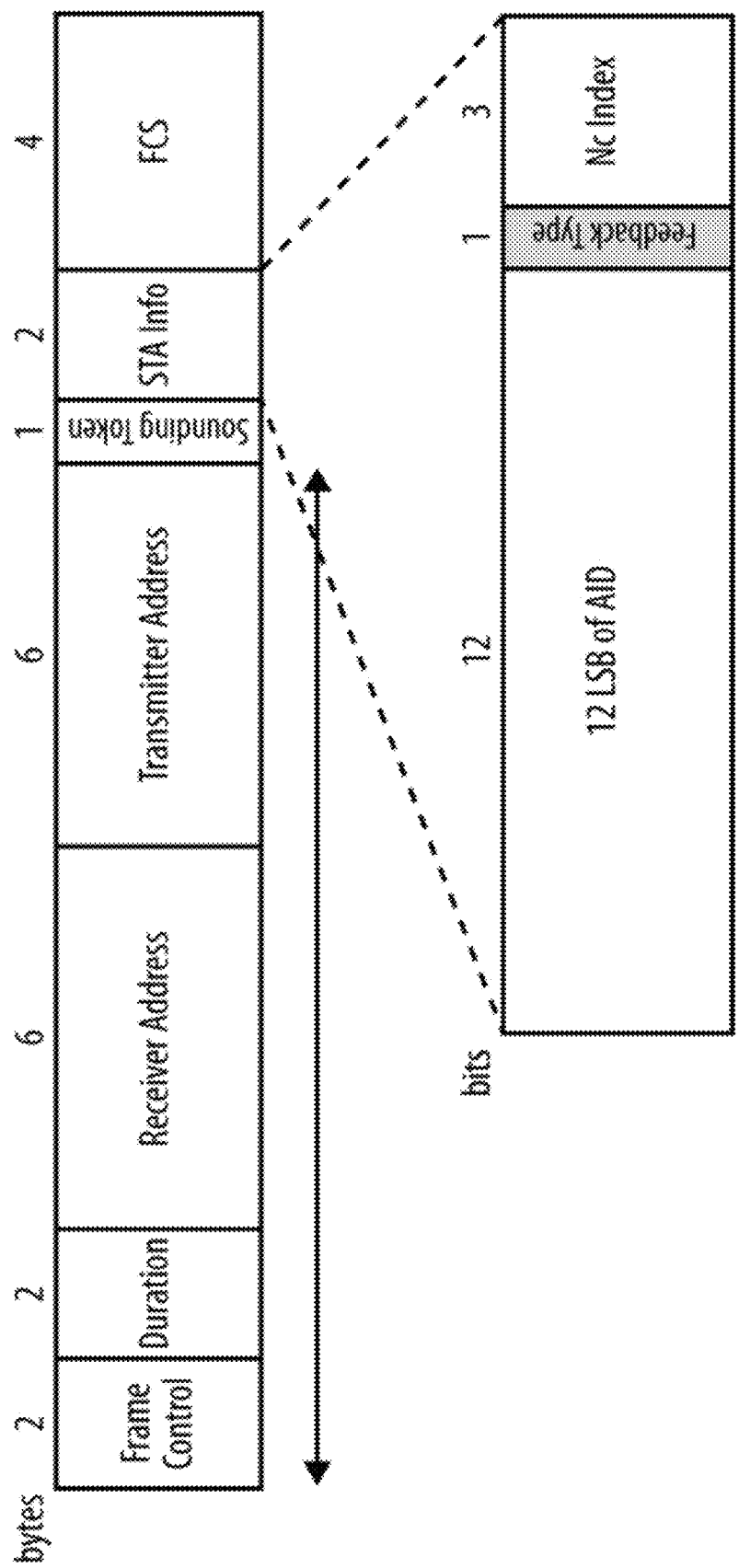
FIG. 10 illustrates an example null data packet announcement frame format.

In some embodiments, the main purpose of the NDP announcement frame is to carry a single STA info field for the intended beamformee. The STA info field is two bytes long and consists of three fields as depicted in NDP announcement frame format in FIG. 10 and further discussed below:

1. AID (12 least significant bits of the intended beamformee's association ID): Upon association to an 802.11 access point, one or more client devices 170 can be assigned an association ID. The least significant 12 bits of the beamformee's association ID can be included in this field. When a client device 170 acts as a beamformer, this field is set to 0 because the access point (AP) does not have an association ID.
2. Feedback Type: In a single-user/client NDP announcement frame, this field is always 0.
3. Nc Index: This index describes the number of columns in a feedback matrix, with one column for each spatial stream. As a three-bit field, it can take on eight values, which matches the eight streams supported by 802.11ac. This field is generally set to the number of spatial streams minus one.

The data packet generator 308 can be software including routines for generating and transmitting a data packet including training fields to a beamformee. In some embodiments, the data packet generator 308 can be a set of instructions executable by the processor 204 to provide the functionality described herein. In some other embodiments, the data packet generator 308 can be stored in the memory 206 of the network device 200 and can be accessible and executable by the processor 204. The data packet generator 308 may be adapted for cooperation and communication with the processor 204 and other components of the network device 200 such as the network interface 202, the storage 210, etc.

Figure 11:
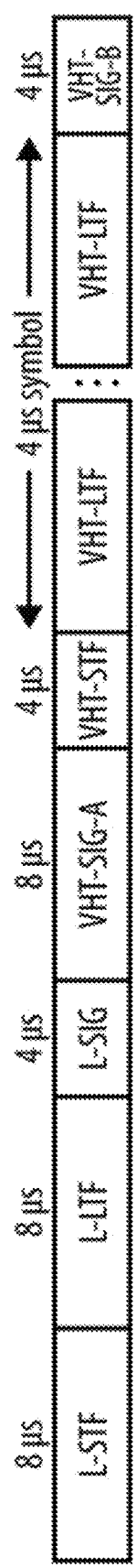
FIG. 11 illustrates an example null data packet format.

In some embodiments, the data packet generator 308 may generate and transmit a data packet frame to a beamformee upon receiving an acknowledgement of the announcement frame from a beamformee as discussed later below with respect to the sounding process acknowledgement module 316. The data packet frame may be a null data packet frame, as depicted for example in FIG. 11. The reason for the name "null data packet" should be obvious in looking at the frame. As depicted in FIG. 11, the null data packet shows a PLOP frame with no data field, so there is no 802.11 MAC frame. In some embodiments, channel sounding can be carried out by analyzing training symbols in the PLOP header and therefore no MAC data is required in the null data packet frame. Within the null data packet frame, as depicted, there is one VHT Long Training Field (VHT-LTF) for each spatial stream used in transmission. This training field may be analyzed to calculate a feedback matrix as discussed in further detail below with respect to the packet processing and feedback module 318.

The sounding interval adjustment module 310 can be software including routines for dynamically adjusting a sounding interval based on feedback information from a beamformee. In some embodiments, the sounding interval adjustment module 310 can be a set of instructions executable by the processor 204 to provide the functionality described herein. In some other embodiments, the sounding interval adjustment module 310 can be stored in the memory 206 of the network device 200 and can be accessible and executable by the processor 204. The sounding interval adjustment module 310 may be adapted for cooperation and communication with the processor 204 and other components of the network device 200 such as the network interface 202, the storage 210, etc.

In some embodiments, to initiate a first sounding process with a beamformee, the sounding interval adjustment module 310 may set a particular sounding interval and send the sounding interval to the sounding process initiation module 306 to initiate the first sounding process with the beamformee. Depending on the feedback information (e.g., feedback matrix) received from the beamformee as depicted, for example, in FIGS. 8A and 8B, the sounding interval adjustment module 310 may adjust the sounding interval to initiate a second sounding process with the beamformee at that interval. This sounding interval may be continuously adjusted by the sounding interval adjustment module 310 as long as channel sounding needs to be performed between the beamformer and the beamformee. In some embodiments, the sounding interval adjustment module 310 may begin performing its functionality described herein responsive to receiving the feedback matrix from the packet processing and feedback 318.

In some embodiments, the sounding interval adjustment module 310 may adjust a sounding interval responsive to determining a change in beamformee's location in the sounding environment or a change in multipath in the environment. For example, as depicted in FIG. 9, the sounding interval adjustment module 310 may decrease the sounding interval from 100 microseconds to 80 microseconds based on the beamformee's movement from an old location to a new location. In some embodiments, the sounding interval adjustment module 310 may determine the beamformee's change in location based on feedback matrix received from the packet processing and feedback module 318. For instance, the feedback matrix received may include location coordinates of the beamformee describing its current location in the sounding environment and the sounding interval adjustment module 310 may compare this feedback matrix to a previously received feedback matrix to determine whether the location coordinates has been changed. Adjusting the sounding interval based on beamformee's mobility (or other change in transmission to the beamformee, such as change in multipath) in the sounding environment is advantageous as it enables the beamformer to be frequently updated of the beamformee's location and transmit beamformed signals towards the beamformee's correct location to achieve maximum beamforming gains possible.

Figure 8B:
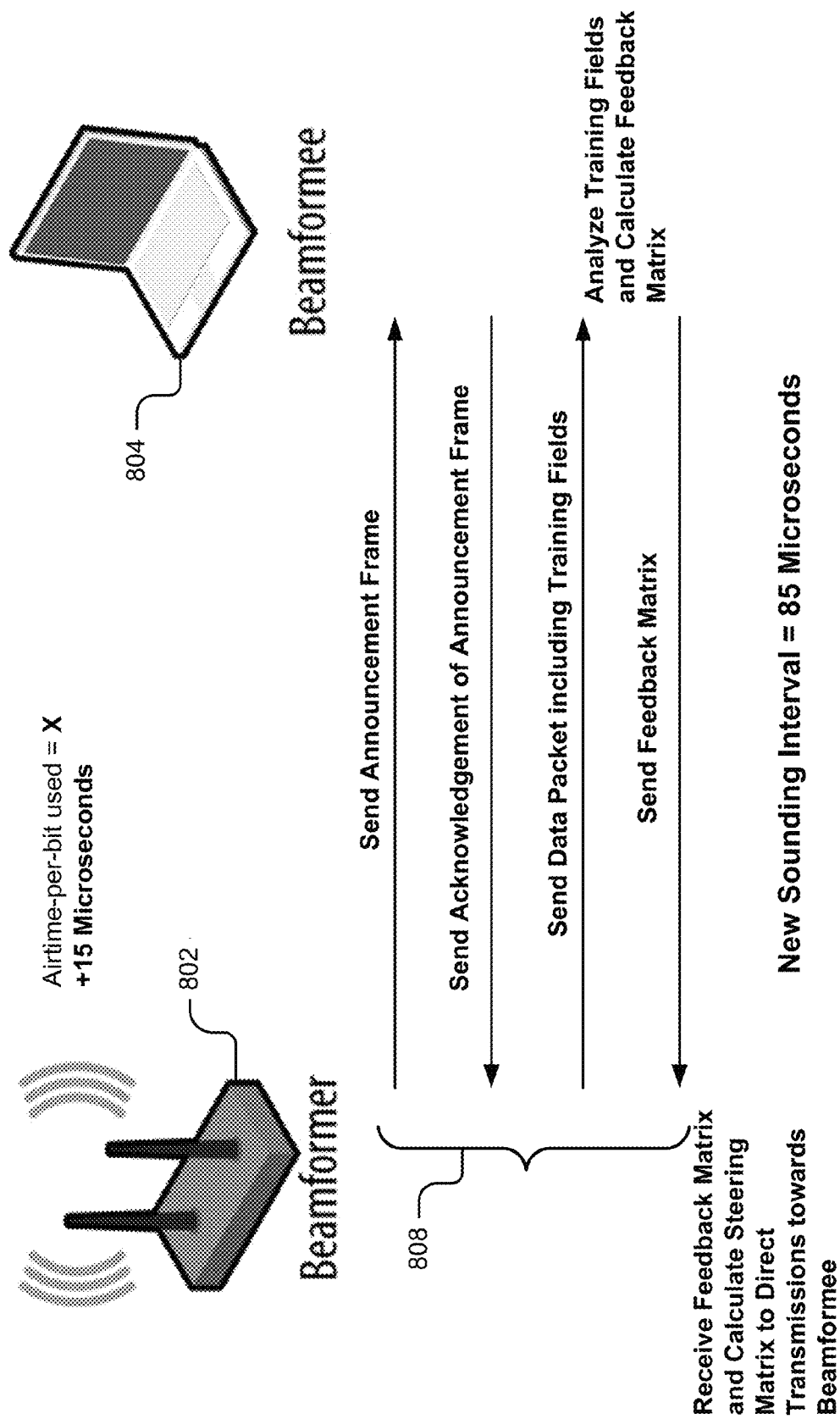

In some embodiments, the sounding interval adjustment module 310 may adjust a sounding interval responsive to determining an increase/decrease in airtime-per-bit value used by a beamformee during a sounding process. For example, as depicted in FIGS. 8A and 8B, the sounding interval adjustment module 310 may increase the sounding interval from 100 microseconds to 85 microseconds to incorporate the increased 15 microseconds airtime-per-bit consumed by the beamformee 804 (see FIG. 8B). In some embodiments, the airtime-per-bit is the time required by the beamformee to analyze each bit of the training field included in the data packet sent by the beamformer as discussed above. In some embodiments, the feedback matrix sent by the beamformee may include the airtime-per-bit information and the sounding interval adjustment module 310 may determine the increase/decrease in airtime-per-bit value by comparing the airtime information in the feedback matrix with airtime information included in a previously received feedback matrix received from the packet processing and feedback module 318. Adjusting the sounding interval based on airtime consumed by a beamformee during a sounding process is advantageous as it enables a beamformer to initiate a subsequent sounding process with the beamformee at correct sounding interval considering the increase/decrease in airtime took by the beamformee during the prior sounding process.

In some embodiments, the sounding interval adjustment module 310 may adjust a sounding interval based on a combination of beamformee's location information (or change in the multipath) and the beamformee's airtime information. As stated above, the beamformee's location and airtime information may be included in the feedback matrix sent by the beamformee. In some embodiments, the sounding interval adjustment module 310 may increase the sounding interval upon determining the beamformee's location and the airtime-per-bit value to be static/unchanged. This is advantageous as frequent or unnecessary sounding processes with the beamformee may be avoided if the beamformee found to be constant during two or more sounding processes in the sounding environment. In some other embodiments, the sounding interval adjustment module 310 may decrease the sounding interval upon finding either of the beamformee's location (or change in multipath to the beamformee) and/or airtime-per-bit value to be changed as discussed elsewhere herein.

It should be understood that criteria for adjusting the sounding interval is not limited to change in beamformee's location (or change in the multipath), change in airtime-per-bit value, and/or a combination of the two as discussed above and may be based on one or more other criteria. For example, the sounding interval adjustment module 310 may adjust a sounding interval based on a type of user and an importance of the user associated with the beamformee/client device. By way of another example, the sounding interval adjustment module 310 may adjust a sounding interval based type of beamformee/client device (whether the client device is a tablet, a smartphone, a desktop, a laptop, etc.). By way of yet another example, the sounding interval adjustment module 310 may adjust the sounding interval based on amount of traffic (such as data packets) exchanged between a beamformer and a beamformee. Yet another example, the sounding interval adjustment module 310 may adjust a sounding interval for sounding process with a beamformee based on movement of other beamformee associated with the beamformee in the sounding environment. Other numerous examples and criteria for sound interval adjustment are also possible and contemplated.

The steering matrix computation module 312 can be software including routines for computing a steering matrix to transmit network signals towards a beamformee in a preferred direction. This process of transmission of network signals or energy towards the beamformee in the preferred direction is generally known as beamforming. In some embodiments, the steering matrix computation module 312 can be a set of instructions executable by the processor 204 to provide the functionality described herein. In some other embodiments, the steering matrix computation module 312 can be stored in the memory 206 of the network device 200 and can be accessible and executable by the processor 204. The steering matrix computation module 312 may be adapted for cooperation and communication with the processor 204 and other components of the network device 200 such as the network interface 202, the storage 210, etc.

In some embodiments, the steering matrix computation module 312 may compute a steering matrix based on a feedback matrix computed at a beamformee. For instance, the packet processing and feedback module 318 may compute the feedback matrix at the beamformee and send the feedback matrix to the steering matrix computation module 312 via the communication module 302. The steering matrix computation module 312 may analyze the feedback matrix and information included in the matrix and may then compute the steering matrix thereon. For instance, as discussed elsewhere herein, the feedback matrix may include information such as location coordinates of a beamformee, multipath information, total airtime used by the beamformee, airtime-per-bit used by the beamformee, type of user associated with the beamformee, type of beamformee, amount of traffic exchanged between the beamformer and the beamformee, history of traffic exchange, etc. and the steering matrix computation module 312 may analyze one or more of this information to compute the steering matrix.

Figure 12:
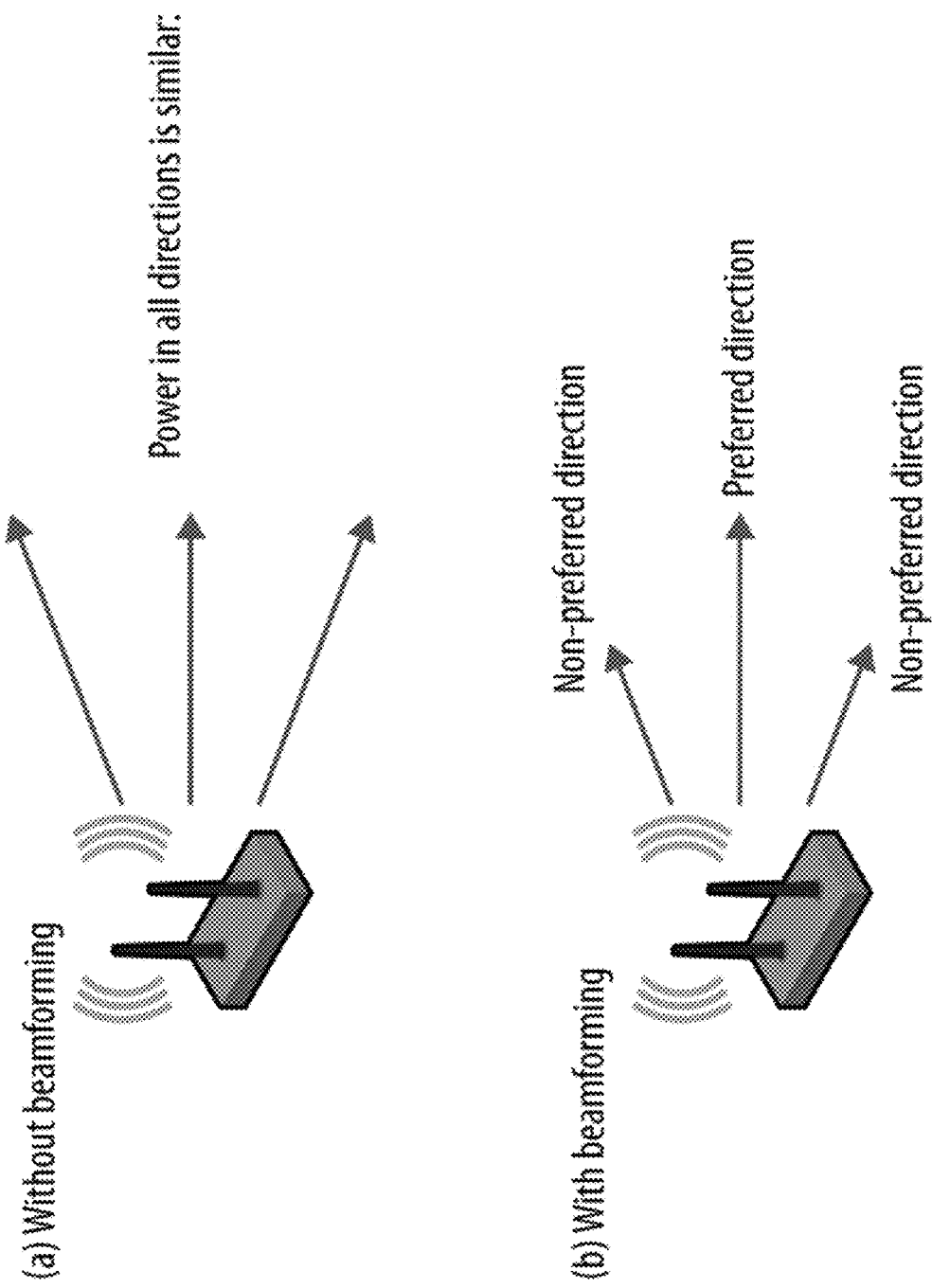
FIG. 12 illustrates two example scenarios of an example beamformer transmitting signals in a sounding environment without a steering matrix applied and with the steering matrix applied.

In some embodiments, the steering matrix computed by the steering matrix computation module 312 is a mathematical description of how to direct transmitted energy toward a receiver (e.g., beamformee/client device). In other words, the steering matrix may describe how to set up each element (e.g., antenna) of a beamformer to precisely overlap transmissions to reach farther to a beamformee. Using the steering matrix computed by the steering matrix computation module 312, a beamformer can transmit data packets/frames to a beamformee in a particular direction, as depicted, for example in FIGS. 12 and 13. As shown in FIG. 12 part (a), without beamforming, energy is radiated in all directions more or less equally. However, upon applying the steering matrix as shown in part (b), the beamformer will send energy in a way that prefers one path. On the preferred path, transmissions from antenna array of the beamformer may reinforce each other, become stronger, and higher beamforming gains may be achieved. While on the other paths, the transmissions from the antenna array may interfere with each other and become weaker. As a result, the combination of the steering matrix and the sounding channel determines whether a signal becomes stronger or weaker.

Figure 13:
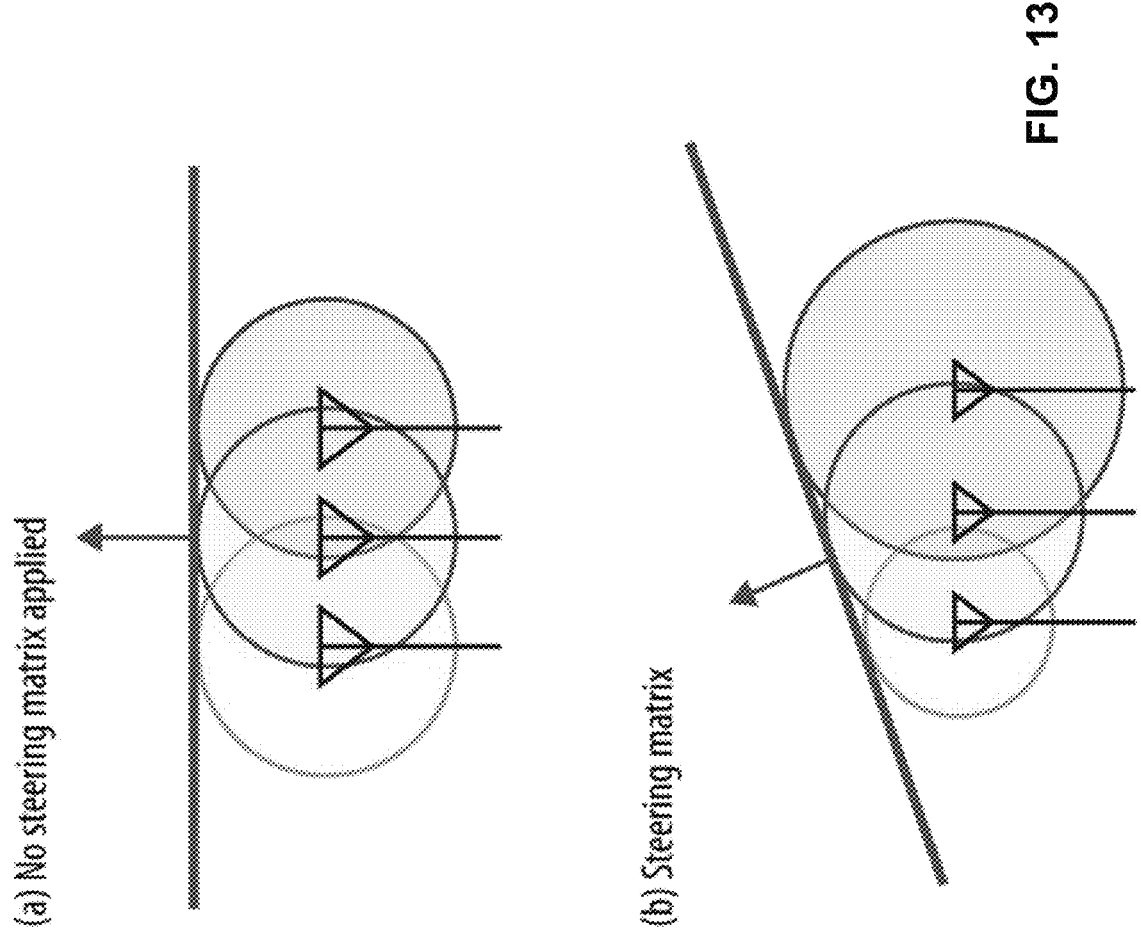
FIG. 13 illustrates two example scenarios of an example beamformer with multiple antennas transmitting signals in a sounding environment without a steering matrix applied and with the steering matrix applied.

By way of another example to illustrate the effect of steering matrix in steering transmissions in a particular direction, FIG. 13 shows a simple phase shift. Part (a) of the figure depicts that all antenna of a beamformer transmit at the same time. As a result, the total transmission radiates in each direction equally i.e., transmissions from each individual array element go out at the same speed at the same time, and therefore cover the same distance. Part (b) of the figure depicts that the array applies a phase shift to each element so that the element on the right transmits first and the element on the left transmits last. As a result, the transmissions from the array will converge along a different path that is shifted to the left.

The beamformee engine 314 can be software including routines for acknowledging sounding process with a beamformer and computing feedback information for the beamformer. In some embodiments, the beamformee engine 314 can be a set of instructions executable by the processor 204 to provide the functionality described herein. In some other embodiments, the beamformee engine 314 can be stored in the memory 206 and can be accessible and executable by the processor 204. As depicted, the beamformee engine 314 may include the sounding process acknowledgement module 316 and the packet processing and feedback module 318.

The sounding process acknowledgment module 316 can be software including routines for acknowledging sounding process initiation request received from a beamformer. In some embodiments, the sounding process acknowledgement module 316 can be a set of instructions executable by the processor 204 to provide the functionality described herein. In some other embodiments, the sounding process acknowledgement module 316 can be stored in the memory 206 and can be accessible and executable by the processor 204. The sounding process acknowledgement module 316 may be adapted for cooperation and communication with the processor 204 and other components of the network device 200 such as the network interface 202, the storage 210, etc.

In some embodiments, the sounding process acknowledgement module 316 may begin performing its functionality respective to receiving an announcement frame from the sounding process initiation module 306 as described elsewhere herein. Responsive to receiving the announcement frame at a beamformee (e.g., client device), the sounding process acknowledgement module 316 may notify a user associated with the beamformee about the announcement frame received from a beamformer and whether to acknowledge that frame. In some embodiments, the user associated with the beamformee may analyze the announcement frame to decide whether to acknowledge the frame to the beamformer. In some embodiments, acknowledging the announcement frame of the beamformer may include beamformee's approval to initiate a sounding process with the beamformer. Upon receiving the beamformee's acknowledgement of the announcement frame, the sounding process acknowledgement module 316 may then send the acknowledgement to the beamformer engine 304 for it to perform its respective acts and/or functionalities thereon. In some embodiments, the sounding process acknowledgement module 316 may cooperate with the communication module 302 to send the acknowledgement to the beamformer engine 304.

The packet processing and feedback module 318 can be software including routines for processing one or more data packets received from a beamformer and computing a feedback matrix. In some embodiments, the packet processing and feedback module 318 can be a set of instructions executable by the processor 204 to provide the functionality described herein. In some other embodiments, the packet processing and feedback module 318 can be stored in the memory 206 and can be accessible and executable by the processor 204. The packet processing and feedback module 318 may be adapted for cooperation and communication with the processor 204 and other components of the network device 200 such as the network interface 202, the storage 210, etc.

In some embodiments, the packet processing and feedback module 318 may begin performing its functionality responsive to receiving a data packet from the beamformer engine 304. For instance, as discussed above with respect to the data generator 308, the data packet may be generated and sent by the data packet generator 308 to the beamformee. The data packet may be a null data packet (NDP) that includes a long training field including one or more training symbols. The packet processing and feedback module 318 may process this data packet to calculate a feedback matrix. In some embodiments, processing the data packet may include analyzing and processing each symbol of the training field included in the data packet and then calculating a feedback matrix based on processing results. In some embodiments, the feedback matrix may describe how the one or more training symbols were received in the NDP, which may allow the beamformer to know to how to steer network signal or subsequent data frames/packets to the beamformee.

In some embodiments, the feedback matrix may be just a steering matrix but in a compressed format. The compression may be required because the steering matrix can potentially have quite large dimensions as it represents the channel behavior between each of the transmitters in the beamformer's array and each of the receivers in the beamformee's array. Therefore, rather than calculating and transmitting the steering matrix, the packet processing and feedback module 318 may calculate a feedback matrix and compress it so that it can be represented by a smaller frame and thus take up less airtime. In some embodiments, compression of the steering matrix (i.e., the feedback matrix) may be accomplished by using matrix operations to send a representative set of values that can be used to reconstitute the steering matrix instead of sending the raw matrix itself.

In some embodiments, to calculate the feedback matrix, the packet processing and feedback module 318 may go through the following procedure:

1. The packet processing and feedback module 318 may receive the null data packet (NDP) generated by the data packet generator 308 from the beamformer. Once the NDP is received, the packet processing and feedback module 318 may process each OFDM subcarrier independently in its own matrix. The matrix may describe the performance of the subcarrier between each transmitter (i.e., beamformer) antenna element and each receiver (i.e., beamformee) antenna element. In some embodiments, the contents of the matrix may be based on the received power and phase shifts between each pair of antennas.

2. The matrix generated in step 1 may be transformed by a matrix multiplication operation called a "Givens rotation", which may depend on parameters called "angles". As discussed above, rather than transmitting the full feedback matrix, the packet processing and feedback module 318 may calculate the angles based on the matrix rotation. In some embodiments, the 802.11 ac standard may specify an order in which these angles are to be transmitted so that the beamformer can receive a long string of bits and appropriately delimit each angle.
3. Having calculated the angles, the packet processing and feedback module 318 may then assemble these angles together into a compressed feedback form so that it can be send to the beamformer as discussed elsewhere herein.

Figure 14:
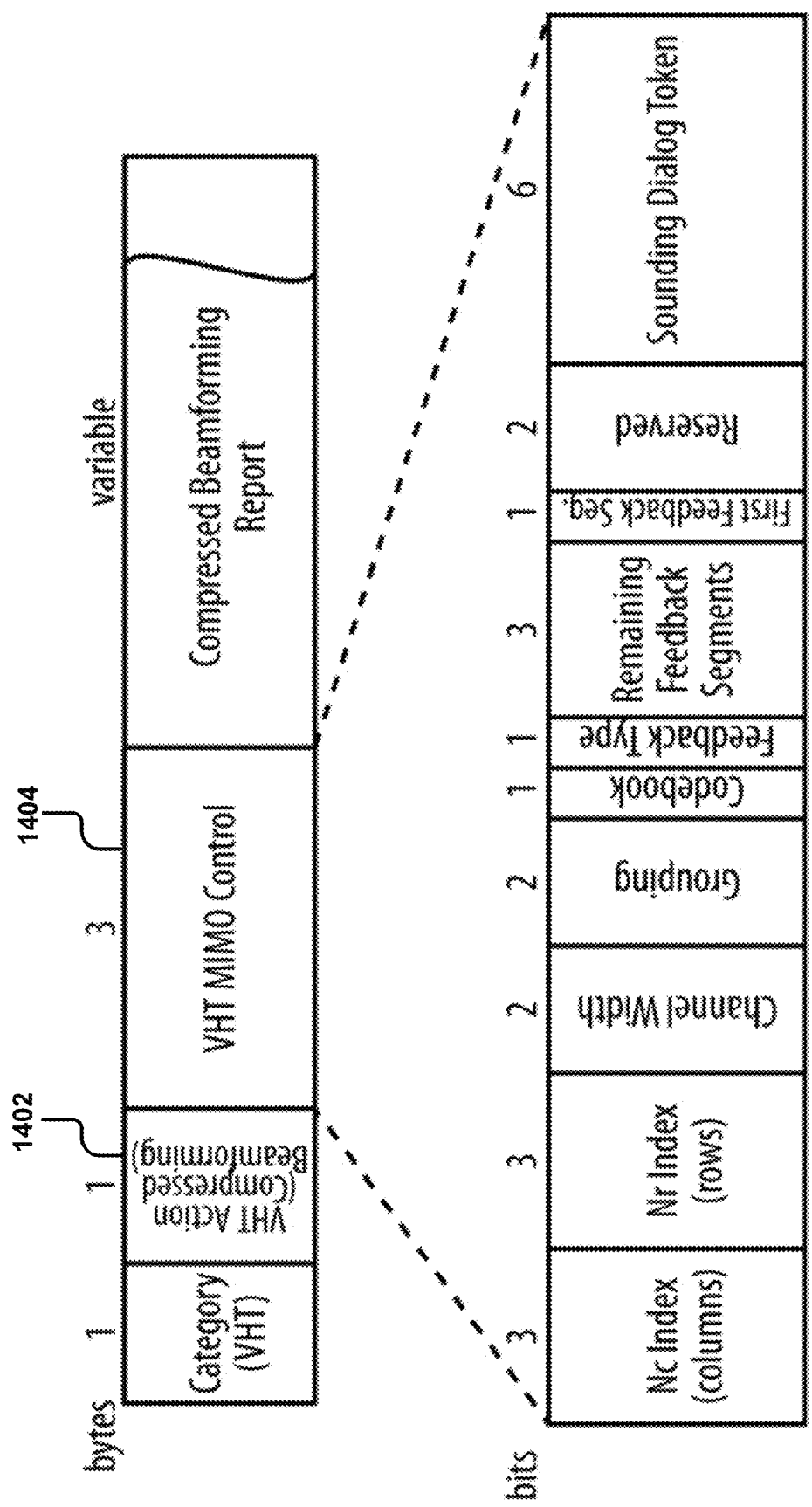
FIG. 14 illustrates an example compressed beamforming report frame format.

In some embodiments, the feedback matrix as calculated and compressed using the above procedure may be sometimes referred to as a compressed beamforming report. FIG. 14 depicts the format of an example compressed beamforming report frame used in a scenario when a single beamformee is involved. As depicted, the VHT Action frame header 1402 indicates that the frame contains a feedback matrix. The VHT MIMO Control field 1404, included next to VHT Action frame header 1402, may enable a beamformer to interpret the feedback matrix by describing the following attributes:

1. Size of the feedback matrix (6 bits): The Nc index and Nr index fields in the VHT MIMO control field 104 may describe the size of the feedback matrix in terms of the number of columns and number of rows.
2. Channel width (2 bits): In some embodiments, the feedback matrix's size may also depend on the size of the underlying channel. Wider channels may require larger feedback matrices because there may be more individual carriers to measure.
3. Grouping (2 bits): When parts of the beamforming matrix are repeating, the beamformee can group multiple spatial streams together to reduce the size of the transmitted matrix.
4. Codebook (1 bit): Generally, a beamforming matrix can be used to describe phase shifts required by each antenna element (e.g., see FIG. 13). 802.11ac transmits the information on these angles as a long string of bits. The receiver of a steering matrix needs to know where to split the bit field into individual matrix elements, and this field can be used to describe the representation of the data.
5. Type of feedback (1 bit): Depends upon number of beamformee's involved. In single-beamformee MIMO, the feedback type will be single beamformee.
6. Flow control (10 bits): The Remaining Feedback Segments and First Feedback Segment fields can be used together with the Sounding Dialog Token to match the response from the beamformee to the beamformer's request. In some embodiments, in very large matrices with wide bandwidths and high number of spatial streams, the matrix may be quite large and therefore may need to be sent to the beamformer in multiple steps.

In some embodiments, a feedback matrix computed by the packet processing and feedback module 318 and then sent to a beamformer may include information that may enable the beamformer to dynamically adjust a sounding interval and further compute a steering matrix as discussed elsewhere herein. Non-limiting examples of information included in the feedback matrix may include location information such as location coordinates of a beamformee describing its current location in the sounding environment; change in multipath in the sounding environment; airtime information such as total airtime used by the beamformee during a sounding process, airtime-per-bit used by the beamformee during computation of the feedback matrix, etc.; current transmission rate being used for transmissions to the beamformee; current distance of the beamformee from the beamformer; packet error rate for packets exchanged between the beamformee and the beamformer; channels state information describing current state of the channel (i.e., whether the channels is strong/weak, current load of the channel, etc.); amount of traffic (i.e., frames/data packets) exchanged between the beamformee and the beamformer; virtual access point (VAP) associated with the beamformee; type of user associated with the beamformee, type of beamformee (i.e., whether the beamformee/client device is a tablet, smartphone, desktop, laptop, etc.); characteristics of data transmitted by the beamformee in the past (i.e., whether the data transmitted by the beamformee is a high priority data or low priority data); etc.

Additional structure, acts, and/or functionality of the one or more components of the channel sounding application 208 including the communication module 302; the beamformer engine 304 including the sounding process initiation module 306, the data packet generator 308, the sounding interval adjustment module 310, and the steering matrix computation module 312; and the beamformee engine 314 including the sounding process acknowledgement module 316 and the packet processing and feedback module 318 are further discussed below with respect to the example process depicted in FIGS. 4-7.

Example Processes

Figure 4:
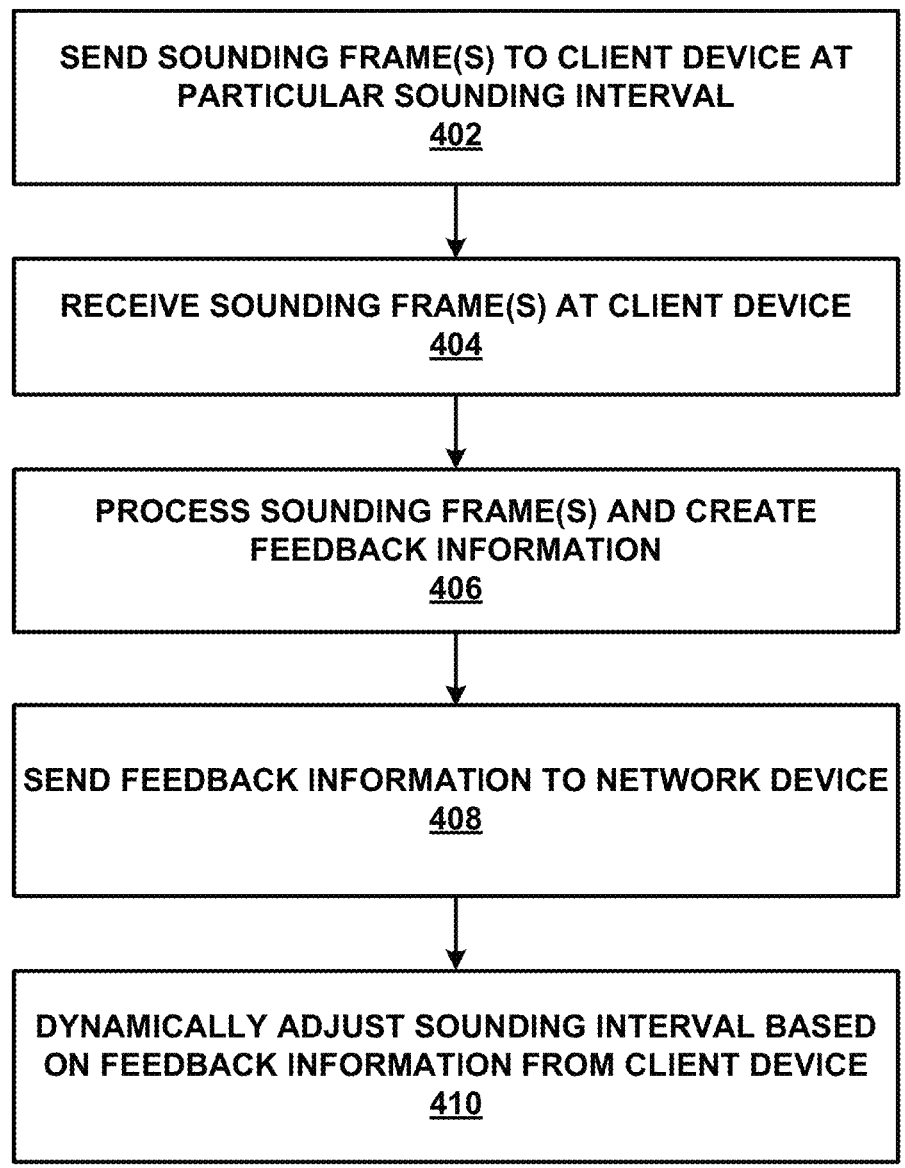
FIG. 4 illustrates an example process for dynamically adjusting sounding interval based on feedback information from an example client device according to embodiments of the present disclosure.

FIG. 4 illustrates an example process 400 for dynamically adjusting sounding interval based on feedback information from an example client device according to embodiments of the present disclosure. The process 400 begins when the beamformer module 304 via the communication module 302 sends 402 one or more sounding frames to a client device at a particular sounding interval. In some embodiments, the one or more sounding frames may include, for example, an announcement frame and a null data packet including training fields as depicted in FIG. 8A and described elsewhere herein. The beamformee module 314 receives 404 the one or more sounding frames at the client device and processes 406 the one or more sounding frames to create feedback information. The feedback information may include client device's (i.e., beamformee's) feedback on communication channel between the client device and a network device from which it received the one or more sounding frames. In some embodiments, the feedback information from the client device may include change of location information for the client device as described elsewhere herein. In other embodiments, the feedback information from the client device may include change in multipath to the client device. The beamformee module 314 may then via the communication module 302 sends 408 the feedback information back to a network device (e.g., a beamformer) from which it received the one or more sounding frames. In some embodiments, the network device may be an access point capable of transmitting beamformed signals to the client device. The beamformer module 304 upon receiving the feedback information may then dynamically adjust 410 a sounding interval used to initiate the sounding process based on the feedback information from the client device.

Figure 5A:
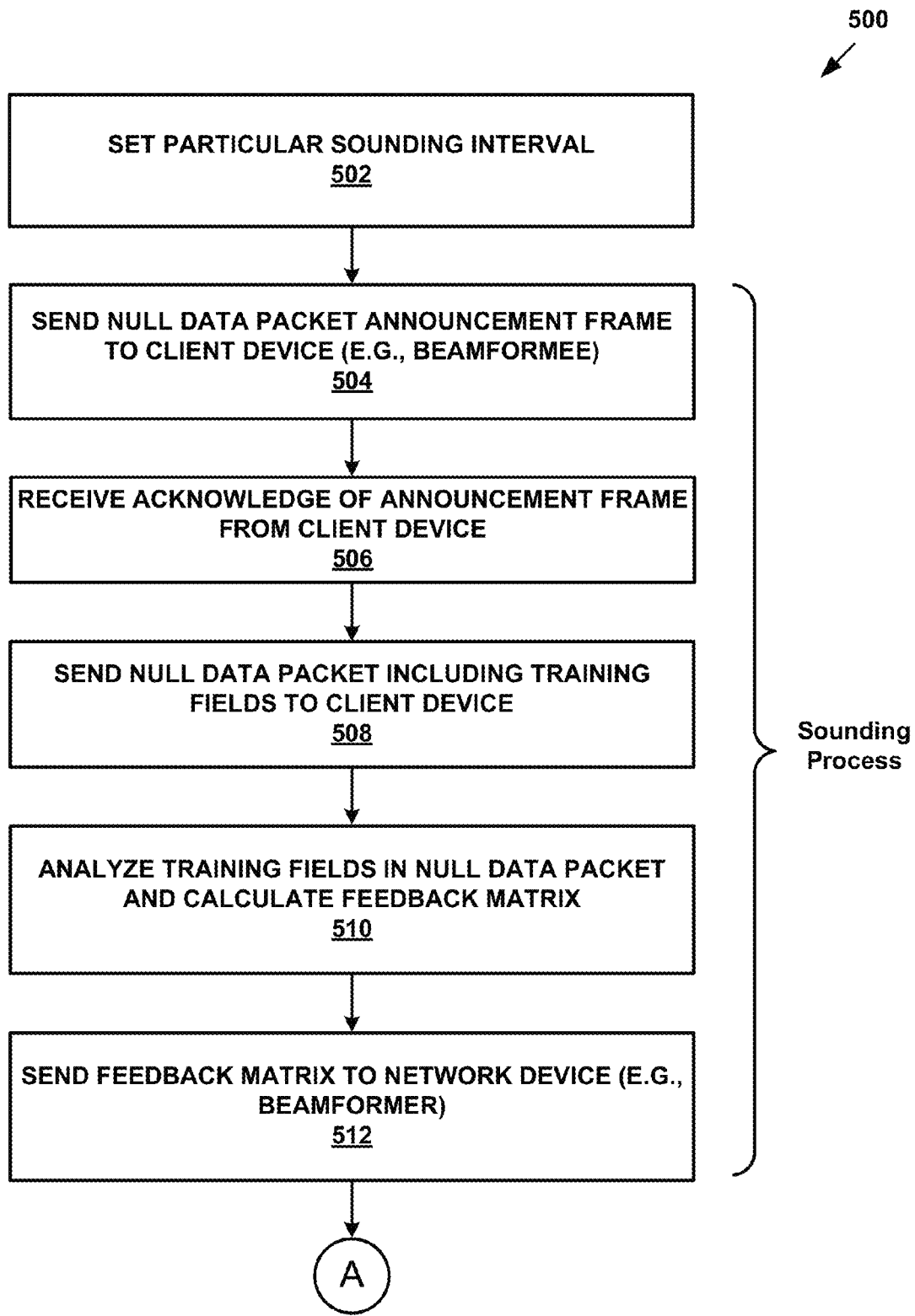
FIGS. 5A and 5B illustrate an example process for dynamically adjusting sounding interval based on client device mobility or a change in the multipath environment according to embodiments of the present disclosure.
Figure 5B:
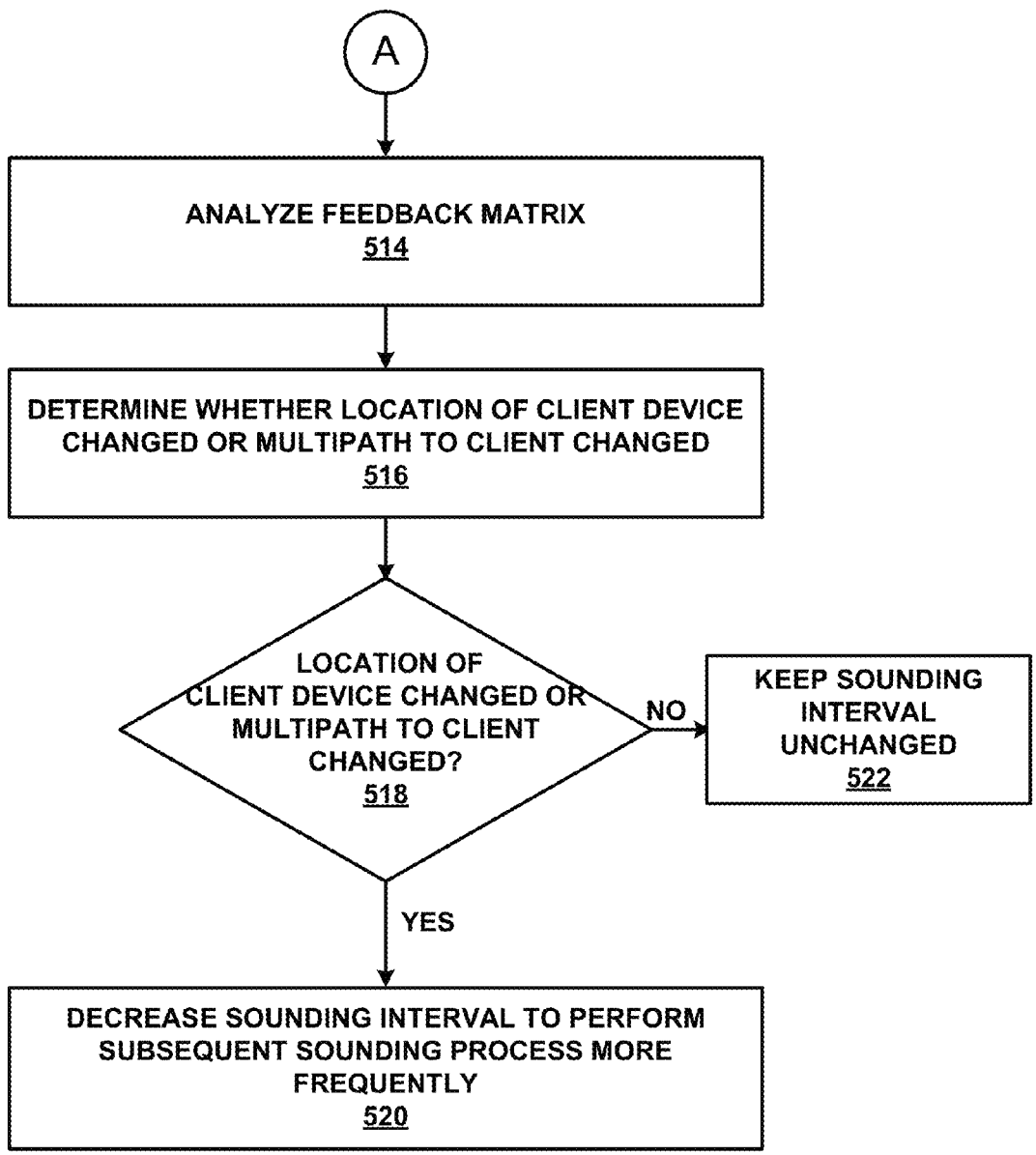

FIGS. 5A and 5B illustrate an example process 500 for dynamically adjusting sounding interval based on client device mobility according to embodiments of the present disclosure. The process 500 begins by setting 502 a particular sounding interval. For example, the sounding interval may be set to 100 microseconds. In some embodiments, the sounding interval may indicate a particular interval at which a network device (e.g., beamformer) must initiate a sounding process with a client device (e.g., beamformee). The sounding process initiation module 306 of the beamformer engine 304 may send 504 a null data packet announcement frame to the client device and may receive 506 an acknowledgement of the announcement frame from the client device. For instance, the sounding process acknowledgement module 316 of the beamformee engine 314 may acknowledge the announcement frame and send the acknowledgment back to the beamformer engine 304. In some embodiments, the sounding process initiation module 306 may perform the operations in blocks 504 and 506 to identify one or more client devices in a network environment and to establish a sounding process with one or more of those client devices.

Once the sounding process initiation module 306 receives the acknowledgment of the announcement frame from the client device, the data packet generator 308 may generate a null data packet including training fields and may send 508 the data packet via the communication module 302 to the client device. The packet processing and feedback module 318 of the beamformee engine 314 may then analyze 510 the training fields in the data packet and calculate a feedback matrix. The feedback matrix may include, without limitation, metrics describing overall quality of the sounding channel on which the client device and the network device are communicating, location coordinates describing the current location and any past locations of the client device, signal information indicating multipath to the client device, total airtime used by the client device for analyzing the training fields and calculating the matrix, type of client device, type of user associated with the client device, total packets exchanged between the network and the client device, etc. Once the packet processing and feedback module 318 calculates the feedback matrix in block 510, the packet processing and feedback module 318 may then send 512 the feedback matrix via the communication module 302 to the network device.

Next, the sounding interval adjustment module 310 of the beamformer engine 304 may analyze 514 the feedback matrix (See FIG. 5B) and determine 516 whether the location of the client device has been changed (or multipath to the client device has changed). For example, as stated above, the feedback matrix may include location coordinates describing the current and any past locations of the client device and the sounding interval adjustment module 310 may analyze the feedback matrix for this information to determine in block 518 whether the location of the client device has been changed or multipath to the client device has changed. If the result of the determination in block 518 is affirmative, the sounding interval adjustment module 310 may decrease 520 the sounding interval (e.g., 100 microseconds to 80 microseconds) to perform subsequent sounding process with the client device more frequently. If on the other hand, the result of the determination in block 518 is negative, then the sounding interval adjustment module 310 may keep the sounding interval unchanged.

Figure 6A:
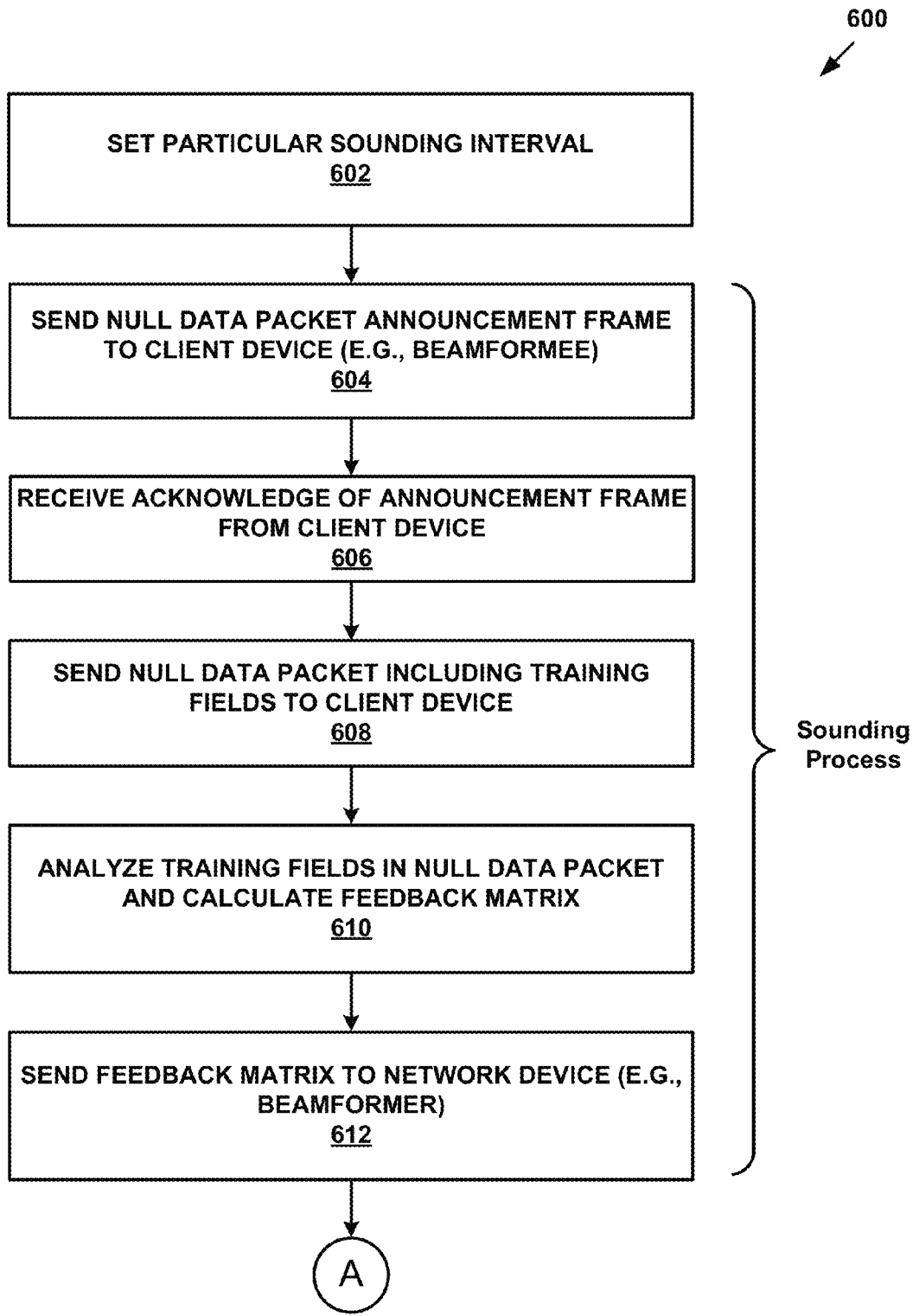
FIGS. 6A-6C illustrate an example process for dynamically adjusting sounding interval based on total airtime used by an example client device during an example sounding process according to embodiments of the present disclosure.
Figure 6B:
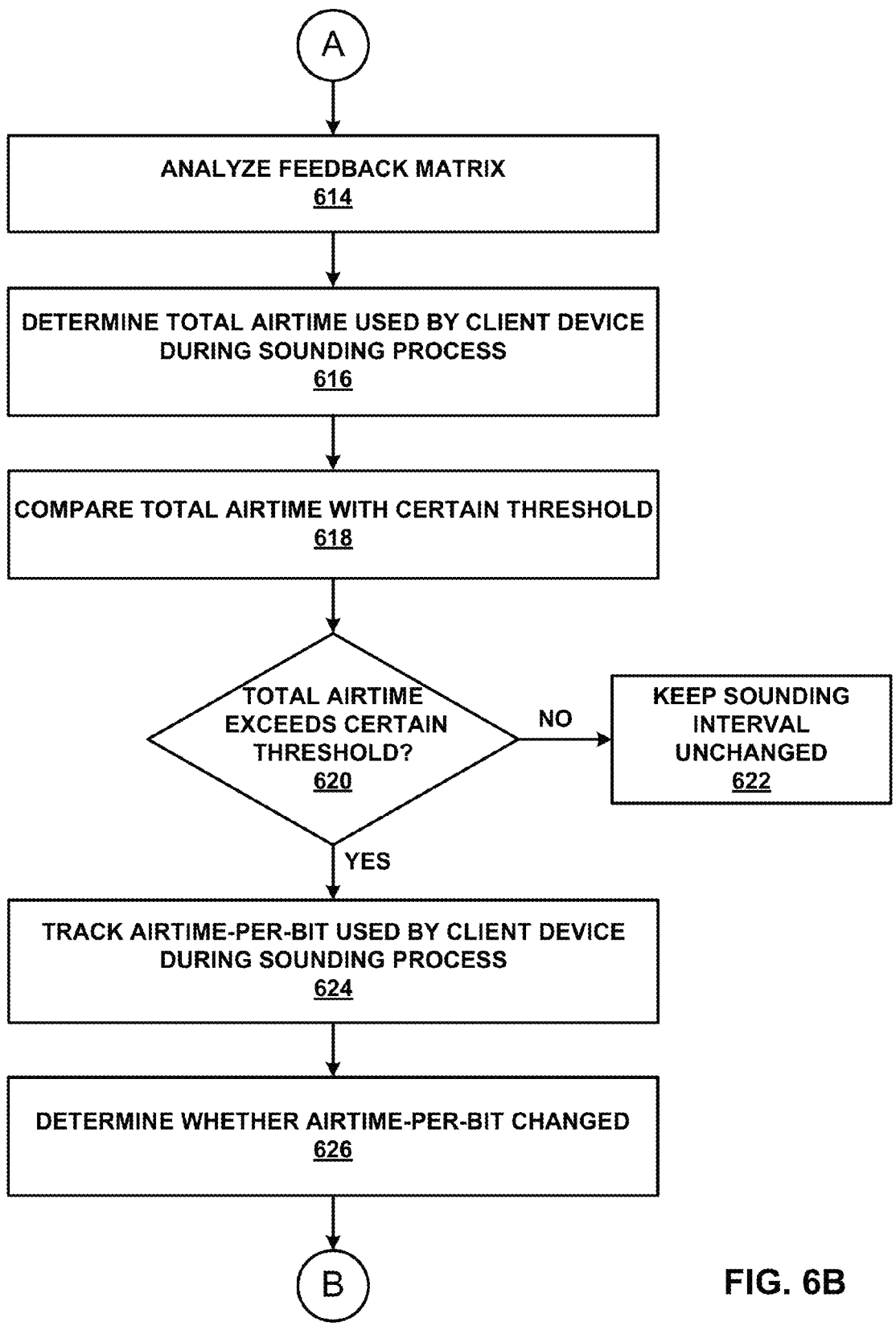
Figure 6C:
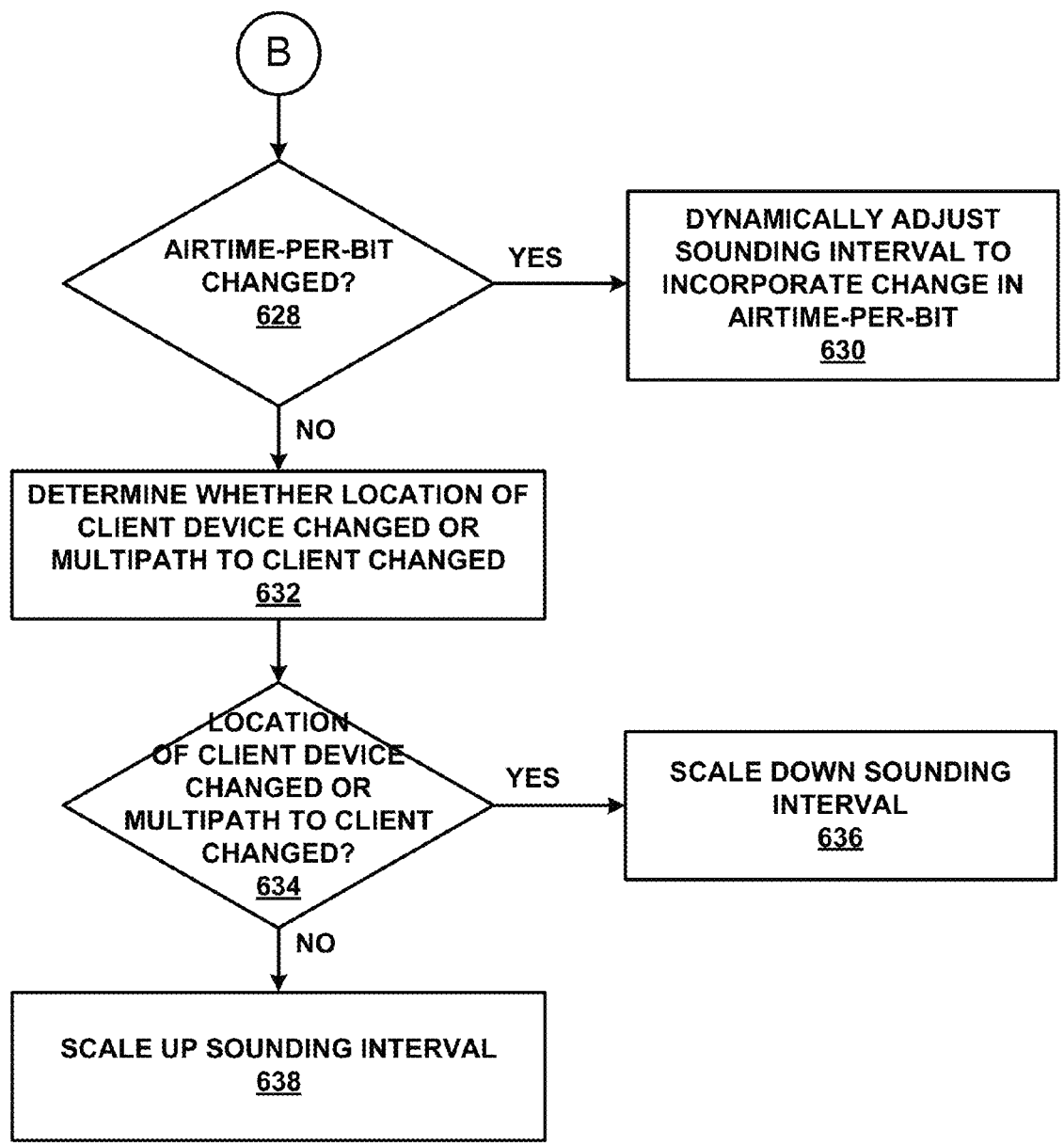

FIGS. 6A-6C illustrate an example process 600 for dynamically adjusting sounding interval based on total airtime used by an example client device during an example sounding process according to embodiments of the present disclosure. As discussed above with respect to FIG. 5A, the process 600 may set 602 a particular sounding interval, may send 604 a null data packet announcement frame to a client device (e.g., beamformee), may receive 606 an acknowledgement of the announcement frame from the client device, may send 608 a null data packet including training fields to the client device, may analyze 610 the training fields in the data packet and calculate a feedback matrix, and may send 612 the feedback matrix to a network device (e.g., beamformer). Detailed description for operations in blocks 602-612 have already been described above with respect to FIG. 5A and will not be repeated here.

Next, the sounding interval adjustment module 310 of the beamformer engine 304 may analyze 614 the feedback matrix (See FIG. 6B) and determine 616 a total airtime consumed by the client device using the sounding process. For example, the feedback matrix received from the client device may include a total airtime-per-bit used by the beamformee engine 314 during the operation in block 610 and the sounding interval adjustment module 310 may analyze the feedback matrix to perform its determination in block 616. The sounding interval adjustment module 310 may then compare 618 the total airtime with a certain threshold. By way of example, the total airtime used by the client device may be 55 microseconds and the sounding interval adjustment module 310 may determine whether that airtime (i.e., 55 microseconds) is greater/less than a threshold airtime (e.g., 50 microseconds). The sounding interval adjustment module 310 may then determine in block 620 whether the total airtime exceeds the certain threshold based on the comparison in block 618. If the result of the determination in block 620 is negative, then the sounding interval adjustment module 310 may keep 622 the sounding interval as unchanged.

If on the other hand, the result of the determination in block 620 is affirmative, then the sounding interval adjustment module 310 may track 624 airtime-per-bit that is used by the client device during analyzing the training fields and calculating the feedback matrix in block 610. Responsive to tracking, the sounding adjustment interval module 310 may determine 626 as to whether the airtime-per-bit is changed. If the airtime-per-bit is changed (see block 628 in FIG. 6C), then the sounding interval adjustment module 310 may dynamically adjust 630 the sounding interval (as set in block 602) to incorporate the change in airtime-per-bit. By way of example, if the airtime-per-bit is increased by 15 microseconds and let's say the sounding interval was set to 100 microseconds in block 602, then the sounding interval adjustment module 310 may scale up the set sounding interval to 115 microseconds. Continuing this example, if on the other hand, the airtime-per-bit is determined to be decreased by 15 microseconds, then the sounding interval adjustment module 310 may scale down the set sounding interval to 85 microseconds.

If the result of the determination in block 628 is negative, then the sounding interval adjustment module 310 may determine 632 whether the location of the client device has been changed or the multipath to the client device has changed. For example, as stated above with respect to FIGS. 5A and 5B, the feedback matrix may include location coordinates describing the current and any past locations of the client device and the sounding interval adjustment module 310 may analyze the feedback matrix for this information to determine in block 634 whether the location of the client device has been changed or the multipath to the client device has changed. If the result of the determination in block 634 is affirmative, then the sounding interval adjustment module 310 may scale down 636 the sounding interval (e.g., 100 microseconds to 80 microseconds). If on the other hand, the result of the determination in block 634 is negative, then the sounding interval adjustment module 310 may scale up the sounding interval (e.g., 100 microseconds to 110 microseconds).

Figure 7:
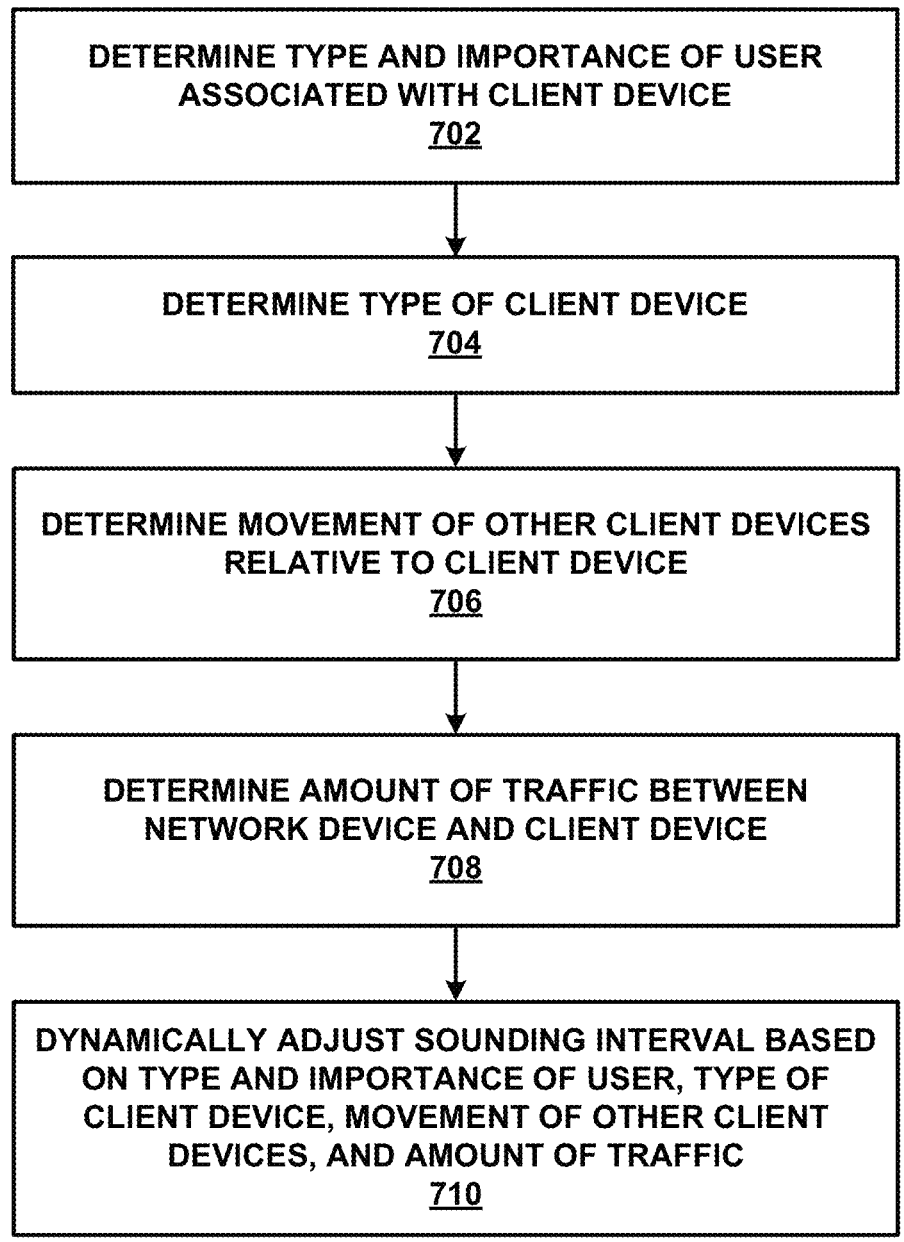
FIG. 7 illustrates an example process for dynamically adjusting sounding interval based on one or more other criteria according to embodiments of the present disclosure.

FIG. 7 illustrates an example process 700 for dynamically adjusting sounding interval based on one or more other criteria according to embodiments of the present disclosure. The process 700 begins by determining 702 a type and importance of user that is associated with a client device to which to beamform network signals. The process 700 may determine 704 a type of the client device. For example, whether the client device is a desktop, a tablet, a laptop, a smartphone, a palmtop, etc. The process 700 may then determine 706 a movement of other client devices relative to the client device. Next, the process 700 may determine 708 an amount of traffic that has been exchanged between the client device (e.g., beamformee) and a network device (e.g., beamformer) so far. The process 700 may then dynamically adjust 710 a sounding interval based on the type and importance of the user, the type of the client device, the movement of other client devices relative to the client device, and/or the amount of the traffic between the client device and the network device.

It should be understood that dynamically adjusting the sounding interval is not limited to the factors stated in the process 700 and may be based on other numerous factors for sounding interval adjustment. For example, the sounding interval may be adjustment based on current transmission rate being used for transmissions to the client device; current distance of the client device from the network device; packet error rate for packets exchanged between the client device and the network device; channels state information describing current state of the channel (i.e., whether the channels is strong/weak, current load of the channel, etc.); virtual access point (VAP) associated with the client device; characteristics of data transmitted by the client device (i.e., whether the data transmitted by the beamformee is a high priority data or low priority data), number of client devices associated with the network device for transmission, etc. In some embodiments, the operations in the blocks 702-710 may be performed by the sounding interval adjustment module 310.

Example Graphical Representations

FIG. 8A is a graphical representation illustrating an example first sounding process 806 between an example beamformer 802 and an example beamformee 804. As depicted, the first sounding process 806 comprises of 4 steps that begins when: first, the beamformer 802 sends an announcement frame to the beamformee 804; second, the beamformee 804 sends an acknowledgement of the announcement frame to the beamformer 802; third, the beamformer 802 sends a data packet including training fields to the beamformee 804; and fourth, the beamformee 804 analyzes the training fields, calculates a feedback matrix, and sends the feedback matrix to the beamformer 802. As further depicted, the beamformer 802 upon receiving the feedback matrix from the beamformee 804 calculates a steering matrix to direct transmissions towards the beamformee 804. In some embodiments, airtime-per-bit used by the beamformee 804 during the sounding process 806 may be monitored by the access point, which in this case is X microseconds, and the beamformer 802 may scale up or scale down the sounding interval based on the airtime-per-bit used. As state earlier, we may way want to monitor the airtime-per-bit used as the change in airtime-per-bit used by the beamformee may be an indirect indication of the link quality In this example, the sounding interval based on the X microseconds airtime-per-bit value is currently set to 100 microseconds.

FIG. 8B is an example graphical representation illustrating a process for dynamically adjusting sounding interval based on an increase in airtime-per-bit used by the example beamformee 804 during a second sounding process 808. As depicted, the second sounding process 808 also comprises of the same 4 steps as discussed above with respect to the FIG. 8A. The beamformer 802 upon receiving an indication that the airtime-per-bit has increased, can then adjust the sounding interval by scaling down the sounding interval (to, for example, 85 microseconds) to incorporate the increase in airtime-per-bit value and increase the frequency of sounding.

FIG. 9 is an example graphical representation illustrating dynamic adjustment of sounding interval based on movement of an example beamformee from one location to another. As indicated by reference numeral 900 in the figure, an example sounding process 906 is occurring between an example beamformer 902 and an example beamformee 904. The sounding interval has been set to 100 microseconds, which basically means that the sounding process 906 will be initiated between the beamformer 902 and the beamformee 904 at every 100 microseconds. Reference numeral 920 depicts that the beamformee 904 has been moved to a new location as indicated by signal line 908. Signal line 906 indicates the existing sounding channel where the sounding process was happening between the beamformer 902 and the beamformee 904 based on the old location of the beamformee 904. Dashed line 910 indicates a new sounding channel where the subsequent sounding processes should occur based on the new location of the beamformee. As described elsewhere herein, since the location of the beamformee 904 has been changed in the channel sounding environment, the sounding interval has been decreased from 100 microseconds to 80 microseconds to perform the subsequent sounding more frequently. It should be understood that the new sounding interval values depicted in FIGS. 8B and 9 are for example purposes only and that the sounding interval may be increased/decreased by any value as required and appropriate.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "digital device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Input/output or I/O devices (including but not limited to keyboards, displays, pointing devices, etc.) can be coupled to the system either directly or through intervening I/O controllers.

The particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming.

It will be appreciated to those skilled in the art that the preceding examples and embodiments are example and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A non-transitory computer readable medium comprising instructions which, when executed by one or more devices, causes performance of operations comprising:

periodically transmitting, by a network device, sounding frames to a particular device at a first sounding interval, wherein the first sounding interval refers to a first interval of time between transmission of sounding frames;

receiving from the particular device a first feedback matrix corresponding to the sounding frames transmitted at the first sounding interval;

based on one or more current conditions included in the first feedback matrix, selecting a second sounding interval to transmit the sounding frames to the particular device, wherein:

the second sounding interval refers to a second interval of time between transmission of sounding frames; and the second sounding interval is different than the first sounding interval;

computing a steering matrix to direct the sounding frames to the particular device at the second sounding interval, wherein the steering matrix is calculated based on the first feedback matrix;

periodically transmitting the sounding frames to the particular device at the second sounding interval; and receiving from the particular device a second feedback matrix corresponding to the sounding frames transmitted at the second sounding interval.

2. The medium of claim 1, wherein the second sounding interval is dynamically selected based on a current data transmission rate being used for transmissions to the particular device.

3. The medium of claim 1, wherein the second sounding interval is dynamically selected based on a rate at which the particular device is physically moving within a physical environment.

4. The medium of claim 1, wherein the second sounding interval is dynamically selected based on an estimate of a current distance between (a) the network device and (b) the particular device.

5. The medium of claim 1, wherein the second sounding interval is dynamically selected based on a packet error rate for packets exchanged between (a) the network device and (b) the particular device.

6. The Medium of claim 1, wherein the feedback matrix comprises Channels State Information (CSI).

7. The medium of claim 1, wherein the operations further comprise modifying a radiation pattern for transmitting wireless signals to the particular device.

8. The medium of claim 1, wherein the operations further comprise decreasing the second sounding interval at least in response to detecting physical movement in an environment of the particular device.

9. The medium of claim 1, wherein the second sounding interval is dynamically determined based at least on a number of client devices associated with a network device that performs the transmitting operations.

10. The medium of claim 1, wherein the second sounding interval is dynamically determined based on one or more of:

a current amount of data being transmitted by the particular device, being transmitted to the particular device, being transmitted by a second device different than the particular device, and/or being transmitted to the second device.

11. The medium of claim 1, wherein the second sounding interval is dynamically determined based on a current load of a radio frequency channel used for communication with the particular device.

12. The medium of claim 1, wherein the second sounding interval is dynamically determined based on a Virtual Access Point (VAP) with which the particular device is associated.

13. The medium of claim 1, wherein the second sounding interval is dynamically determined based on a user role associated with a user of the particular device.

14. The medium of claim 1, wherein the second sounding interval is dynamically determined based on a type of the particular device.

15. The medium of claim 1, wherein the second sounding interval is dynamically determined based on characteristics of data transmitted by the particular device.

16. The medium of claim 1, wherein a process for selection of a new sounding interval for transmitting the sounding frames is initiated in response to determining that a radiation pattern used for devices, other than the particular device, has been modified.

17. The medium of claim 1, wherein the second sounding interval is selected based on characteristics associated with a plurality of devices which are targets for wireless signals transmitted by the network device.

18. The medium of claim 1, wherein the second sounding interval is used for transmitting sound frames by a first radio of a network device, and wherein the second sounding interval is based at least on a third sounding interval used by a second radio of the network device.

19. A non-transitory computer readable medium comprising instructions which, when executed by one or more devices, causes performance of operation comprising:

periodically performing, by a network device, a sounding process at a first sounding interval to obtain a feedback matrix, wherein the first sounding interval refers to a first interval of time between transmission of sounding frames;

based on one or more current conditions included in the feedback matrix, selecting a second sounding interval to perform the sounding process, wherein:

the second sounding interval refers to a second interval of time between transmission of sounding frames; and the second sounding interval is different than the first sounding interval;

computing a steering matrix to direct the sounding frames based on the feedback matrix; and periodically performing, by the network device, the sounding process at the second sounding interval to obtain an additional feedback matrix.

* * * * *